United States Patent
Zohrevand et al.

(10) Patent No.: US 11,720,751 B2
(45) Date of Patent: Aug. 8, 2023

(54) GLOBAL, MODEL-AGNOSTIC MACHINE LEARNING EXPLANATION TECHNIQUE FOR TEXTUAL DATA

(71) Applicant: Oracle International Corporation, Redwood Shores, CA (US)

(72) Inventors: Zahra Zohrevand, Vancouver (CA); Tayler Hetherington, Vancouver (CA); Karoon Rashedi Nia, Vancouver (CA); Yasha Pushak, Vancouver (CA); Sanjay Jinturkar, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 271 days.

(21) Appl. No.: 17/146,375

(22) Filed: Jan. 11, 2021

(65) Prior Publication Data

US 2022/0229983 A1    Jul. 21, 2022

(51) Int. Cl.
*G06F 17/00* (2019.01)
*G06F 40/284* (2020.01)
(Continued)

(52) U.S. Cl.
CPC .......... *G06F 40/284* (2020.01); *G06F 40/166* (2020.01); *G06F 40/30* (2020.01); *G06N 20/00* (2019.01)

(58) Field of Classification Search
CPC ...... G06F 40/284; G06F 40/166; G06F 40/30; G06F 3/04842; G06F 40/169; G06N 20/00
(Continued)

(56) References Cited

U.S. PATENT DOCUMENTS

2017/0068655 A1*  3/2017  Wang ................... G06F 40/284
2020/0265059 A1*  8/2020  Patel ..................... G06F 16/254
(Continued)

OTHER PUBLICATIONS

Ribeiro et al., "Why Should I Trust You? Explaining the Predictions of Any Classifier", In Proceedings of the 22nd ACM SIGKDD International Conference on Knowledge Discovery and Data Mining, dated Aug. 2016, 10 pages.
(Continued)

*Primary Examiner* — Jason T Edwards
(74) *Attorney, Agent, or Firm* — Hickman Becker Bingham Ledesma LLP

(57) ABSTRACT

A model-agnostic global explainer for textual data processing (NLP) machine learning (ML) models, "NLP-MLX", is described herein. NLP-MLX explains global behavior of arbitrary NLP ML models by identifying globally-important tokens within a textual dataset containing text data. NLP-MLX accommodates any arbitrary combination of training dataset pre-processing operations used by the NLP ML model. NLP-MLX includes four main stages. A Text Analysis stage converts text in documents of a target dataset into tokens. A Token Extraction stage uses pre-processing techniques to efficiently pre-filter the complete list of tokens into a smaller set of candidate important tokens. A Perturbation Generation stage perturbs tokens within documents of the dataset to help evaluate the effect of different tokens, and combinations of tokens, on the model's predictions. Finally, a Token Evaluation stage uses the ML model and perturbed documents to evaluate the impact of each candidate token relative to predictions for the original documents.

25 Claims, 6 Drawing Sheets

(51) Int. Cl.
G06F 40/30 (2020.01)
G06F 40/166 (2020.01)
G06N 20/00 (2019.01)

(58) Field of Classification Search
USPC .......................................................... 704/9
See application file for complete search history.

(56) References Cited

U.S. PATENT DOCUMENTS

| | | | |
|---|---|---|---|
| 2020/0265316 A1* | 8/2020 | Das | G06F 40/30 |
| 2020/0402098 A1* | 12/2020 | Bent, III | G06Q 30/0244 |
| 2021/0110527 A1* | 4/2021 | Wheaton | G06F 40/284 |
| 2021/0173829 A1* | 6/2021 | Zeng | G06F 40/47 |

OTHER PUBLICATIONS

Rdrr.io, "Plot_Superpixels: Test Super Pixel Segmentation", https://rdrr.io/cran/lime/man/plot_superpixels.html, dated Feb. 24, 2022, 2 pages.
Pope et al., "Explainability Methods for Graph Convolutional Neural Networks", In Proceedings of the IEEE/CVF Conference on Computer Vision and Pattern Recognition, dated 2019, 10 pages.
Petkovic et al., "Improving the Explainability of Random Forest Classifier—User Centered Approach", Proceedings of the Pacific Symposium on Biocomputing, https://www.worldscientific.com/doi/pdf/10.1142/9789813235533_0019, dated 2018, 12 pages.
Montavon et al., "Explaining Nonlinear Classification Decisions with Deep Taylor Decomposition", Pattern Recognition, vol. 65, https://www.sciencedirect.com/science/article/pii/S0031320316303582, dated May 2017, 12 pages.
Lundberg et al., "A Unified Approach to Interpreting Model Predictions", 31st Conference on Neural Information Processing Systems, https://proceedings.neurips.cc/paper/2017/file/8a20a8621978632d76c43dfd28b67767-Paper.pdf, dated 2017, 10 pages.
Bach et al., "On Pixel-Wise Explanations for Non-Linear Classifier Decisions by Layer-Wise Relevance Propagation", PloS one, https://journals.plos.org/plosone/article?id=10.1371/journal.pone.0130140, dated Jul. 10, 2015, 46 pages.
Scipy.Org, Statistical Functions (scipy.stats), https://docs.scipy.org/doc/scipy-1.6.0/reference/stats.html, SciPy v1.6.0, dated Dec. 2020, 10 pages.
Ribeiro et al., "Anchors: High-precision Model-agnostic Explanations", In Thirty-Second AAAI Conference on Artificial Intelligence, dated Apr. 2018, 9 pages.
Zintgraf et al., "Visualizing Deep Neural Network Decisions: Prediction difference analysis" dated Feb. 15, 2017, 12 pages.
Akoglu, Haldun, "User's Guide to Correlation Coefficients", Turkish Journal of Emergency Medicine 18, dated 2018, pp. 91-93.
Bakarov, Amir. "A Survey of Word Embeddings Evaluation Methods." dated Jan. 21, 2018, 26 pages.
Breiman, Leo. "Random forests." Machine learning 45.1, dated Jan. 2001, 33 pages.
Hand et al., "Data Mining." Wiley StatsRef: Statistics Reference Online (2014): 1-7.
Koh et al., Understanding Black-box Predictions via Influence Functions, From the 34th International Conference on Machine Learning, Sydney, Australia, PMLR 70, dated Dec. 29, 2020, 12 pages.
Das et al., "Opportunities and Challenges in Explainable Artificial Intelligence (XAI): A Survey", dated Jun. 23, 2020, 24 pages.
Ribeiro et al., "Why should I trust you?" Explaining the predictions of any classifier. In Proceedings of the 22nd ACM SIGKDD, dated Aug. 2016, 10 pages.
Zeiler, M. D., & Fergus, R., "Visualizing and Understanding Convolutional Networks", In European conference on computer vision, Springer, Cham., dated Nov. 28, 2013, 11 pages.
Tenney et al., "What Do You Learn From Context?", Published as a conference paper at ICLR 2019, dated May 15, 2019, 17 pages.
Turney et al., "From Frequency to Meaning: Vector Space Models of Semantics.", Journal of artificial intelligence research 37, dated Mar. 4, 2010, 48 pages.
UCI Machine Learning Repository, "SMS Spam Collection Data Set", https://archive.ics.uci.edu/ml/datasets/SMS+Spam+Collection, dated Jun. 22, 2012, 2 pages.
UCI Machine Learning Repository, "Twenty Newsgroups Data Set", https://archive.ics.uci.edu/ml/datasets/Twenty+Newsgroups, dated Sep. 9, 1999, 2 pages.
Yang et al.,"HEIDL: Learning Linguistic Expressions with Deep Learning and Human-in-the-Loop", dated Jul. 25, 2019, 6 pages.
Yang, H., and John Moody. "Feature Selection Based on Joint Mutual Information." Proceedings of international ICSC symposium on advances in intelligent data analysis, dated 1999, 8 pages.
Yu et al. "Rethinking Cooperative Rationalization: Introspective Extraction and Complement Control". dated Dec. 15, 2019, 13 pages.
Lundberg et al. "A Unified Approach to Interpreting Model Predictions", dated Nov. 25, 2017, In Advances in neural information processing systems, 10 pages.

* cited by examiner

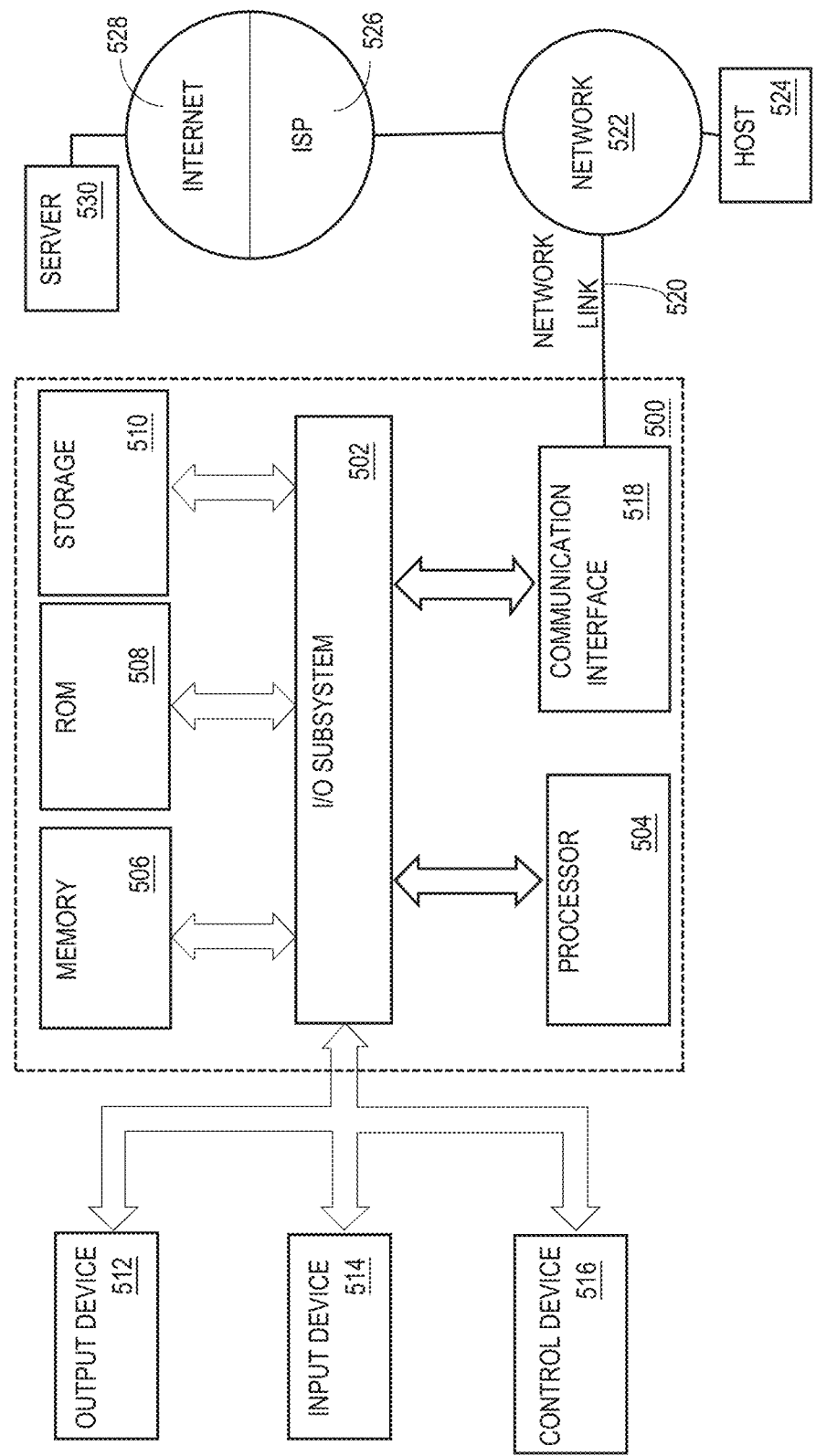

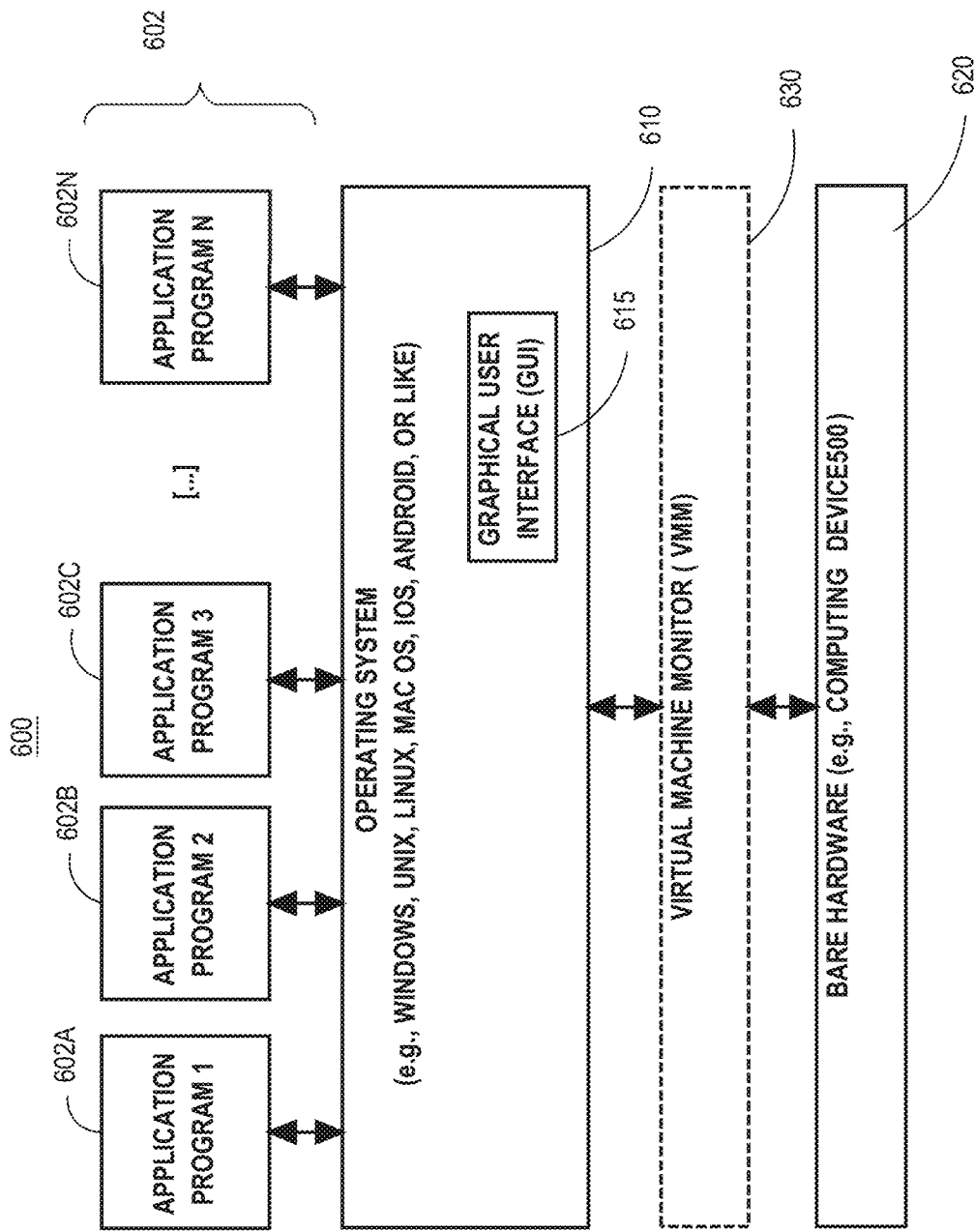

GLOBAL, MODEL-AGNOSTIC MACHINE LEARNING EXPLANATION TECHNIQUE FOR TEXTUAL DATA

FIELD OF THE INVENTION

Techniques described herein relate to efficiently producing high-quality machine-learning explanations, and, more specifically, to providing global, model-agnostic machine learning explanations for machine learning models that are based on textual data.

BACKGROUND

Machine learning and deep learning are becoming ubiquitous for two main reasons: (1) the ability of machine learning to solve complex problems in a variety of different domains, and (2) growth in the performance and efficiency of modern computing resources to support machine learning. However, as the complexity of problems being addressed with machine learning increases, so too does the complexity of the machine learning (ML) models applied to solve these problems.

Deep learning is a prime example of this trend. For example, traditional applications of artificial neural networks generally only contain a few layers of densely connected neurons. In contrast, deep learning applications of neural networks (such as convolutional neural networks) may contain tens to hundreds of layers of neurons performing vastly different operations. Increasing the depth of an ML model and the heterogeneity of layers of the model provides many benefits, including allowing for more complex analysis of inputs. For example, going deeper can increase the capacity of the model, improve the generalization of the model, and provide opportunities for the model to filter out unimportant features. Including layers that perform different operations can greatly improve the performance of the model.

While it is important for an ML model to have high prediction accuracy, many times, it is equally important for a user to be able to understand why a model made a given prediction. For example, consider an ML task used to predict whether a patient requires a specific medication given input features about the patient's health and history. In such a case, it is important to understand why the ML model made a given prediction in order for a doctor to trust the model. Furthermore, recent laws, such as the European Union's "right to an explanation", require that people be provided with an explanation for a decision of a prediction algorithm that has an effect on them, such as an ML-based decision that denied a person's loan application. Thus, it is important to be able to understand why an ML model makes a given prediction in order for machine learning to be useful in various aspects of society.

Enhancements in machine and deep learning algorithms can come at the cost of increased complexity and reduced interpretability of the resulting predictions. For example, given the complexity of deep ML models, explaining and interpreting the results from deep ML models is a challenging task compared to producing explanations for many traditional ML models that are less complex. Consider a simple linear regression ML model with N input features. Once trained, the resulting model is simply a dot product of the N-dimensional data sample feature vector, x, and the learned model weights, m, along with an offset, b, as depicted in the following Function 1.

$$f(x) = \sum_{i=0}^{N-1} m_i x_i + b \qquad \text{(Function 1)}$$

Based on Function 1, understanding the importance of features of the model and how the features contribute to the model's predictions is straightforward: the larger the feature weight, the larger the impact that feature has on the output of the model.

As another example, consider a binary classification decision tree with N input features. During model training, features that have the largest impact on the class predictions are inserted near the root of the decision tree, while features that have less impact on class predictions fall near the leaves of the tree. The importance of a given feature to predictions from such a model can be determined by evaluating (a) the distance of a node (corresponding to the feature and value that maximizes the class split at the node) to the root of the tree, and (b) the ability for this feature to split the class space (impurity).

Less-complex ML models, such as the simple linear regression model and the classification decision tree, are often referred to as being inherently interpretable. However, as the complexity of ML models increase (e.g., the number of features or depth of the decision tree increases), it becomes increasingly challenging to interpret the results of the model. Further, even relatively simple neural networks with a few layers can be challenging to interpret given that multiple layers combine the effects of features and increase the number of operations between the model inputs and outputs. Consequently, there is a requirement for techniques to aid with the interpretation of complex machine learning and deep learning models.

Machine learning explainability (MLX) is the process of explaining and interpreting machine learning and deep learning models. MLX can be broadly categorized into local and global explainability. Local MLX explains why an ML model made a specific prediction corresponding to a given data sample. In other words, local MLX answers the question: "Why did a particular ML model make a specific prediction?" Global MLX explains the general behavior of an ML model as a whole. In other words, global MLX answers the question: "How does a particular ML model work?" or "What did a particular ML model learn from the training data?"

For both local and global explainability, MLX techniques can further be classified as model-agnostic or model-specific. For model-agnostic MLX, the explanations are separated from the underlying ML model being explained, treating the model as a black box. For model-specific MLX, the explanations are tied to the architecture and/or properties of the underlying ML model. There are many different explanation techniques for each combination of local/global and model-agnostic/model-specific explanations.

In addition to the categorizations listed above, there are a variety of different explanation techniques and approaches for different types of data (such as tabular data, textual data, image-specific data, etc.) requiring different ML tasks. Tabular datasets contain data in a columnar format, where each column defines a feature and contains data of a specific type, such as categorical, text, or numerical values, and each row contains a different sample. Textual data, as referred to herein, includes documents having text data (such as natural language data) that is not organized in columnar format. Textual data may include one or both of unstructured data (i.e., data that does not conform to a pre-defined structure) and semi-structured data (i.e., data that has some structure, but does not organize the content into features as does tabular data).

Generally, a textual dataset comprises a set of documents containing natural language text, such as journal articles, white papers, XML documents, JSON documents, etc. According to an embodiment, each document of a textual dataset is referred to as a specific instance of the dataset, where each data instance generally contains multiple units of text data, such as paragraphs (or XML elements, etc.), sentences, words, and/or characters.

Textual dataNatural Language Processing (NLP) comprises processing of text, or natural language, data within textual datasets. Accordingly, an ML model that takes, as input, textual data (as defined above) is referred to herein as an NLP ML model. The main goal of a global NLP explainer is to interpret the general behavior of an NLP ML model as a whole. For example, an NLP explainer identifies tokens (e.g., words, phrases, n-grams, etc.) across multiple textual documents (e.g., the full training dataset for the model) that are likely to be important contributing factors to the NLP ML model's predictions. Because of the large number of unique tokens that are generally found in a textual training dataset, identification of the most important tokens for the NLP ML model is a computationally-intensive task. Further, an explainer for an NLP ML model may take into account steps (such as text processing and tokenization steps) used to prepare the textual training dataset to train the ML model, which further increases the complexity of generating explanations for the NLP ML model.

Because of the complexity of explaining an NLP ML model, the known techniques that attempt to provide global, model-agnostic explanations for NLP ML models are lacking in efficiency, scalability, and accuracy. In fact, as described in further detail below, many of the existing techniques that provide global NLP explanation techniques (a) are model-specific and do not generalize to NLP ML models that are not of the target model type, (b) are produced using a combination of multiple local explanations, or (c) target data other than textual data.

Explanation Techniques for Tabular Data

One related class of global explanation techniques uses permutation to explain models that are based on tabular datasets. The goal of this class of explainer is to identify the important features (columns) of the dataset that contribute to the predictions of a given ML model (referred to as the black box ML model). More specifically, this class of explainers permutes the data, from the data distribution on which a target black box ML model is trained, and evaluates the predictions of the black box ML model on the permuted data to explain the global behavior of the model.

Permutation Importance (PI) is an example of this class of explainers. PI measures the decrease in a model prediction score, compared to a base score, when tabular dataset features are shuffled one at a time. This procedure can be summarized in the following steps:

(1) Per each feature: feature values are randomly shuffled, and the decrease in the model prediction score of the shuffled data, when compared to the original data, is measured.

(2) Step (1) is repeated n iteration times. The average of the decrease in the model prediction score over the n iteration iterations represents the PI value for the target feature.

However, the common permutation-based global explanation approaches, such as PI, are designed specifically for structured (tabular) datasets. Extending such approaches to support textual data is not practical due to the high computational complexity and the probability of evaluating out-of-distribution documents, i.e., permuted documents containing practically-unlikely combinations of tokens. Tabular datasets are structured, having clear feature definitions (e.g., number of inputs, data types, value ranges, etc.). Explanation techniques for tabular data, such as PI described above, can exploit this structured behavior to define how each feature is evaluated relative to the model's behavior.

In contrast, NLP and text processing-related tasks can be very complex, and differ greatly from tabular data analysis tasks. Each document (data instance) of a textual dataset may consist of any number, order, or structure of tokens; there is no notion of features in such data. Consequently, an NLP ML model generally supports a wide range of inputs where the structure is not known a priori (e.g., valid inputs could contain a single character, a few words, or thousands of sentences of text). This unstructured property of textual data also significantly complicates the process of explaining NLP ML models, as there are an infinite number of possible input combinations to evaluate. Therefore, none of the existing feature attribution-based explanation techniques are directly applicable in the context of textual datasets. For example, the cost of applying a permutation-based explanation approach, as performed for tabular data, to explain an NLP ML model would grow exponentially with the number of tokens identified in the text data of a textual training dataset, which severely limits the size of the textual dataset (with respect to the number of documents in the dataset, the sizes of documents in the dataset, and/or the variety of potential tokens present in the dataset) that is able to be analyzed using such approaches.

Textual Data Processing Global Explanation Techniques

There are a few existing model-agnostic, NLP explanation methods, such as LIME and SHAP, which explain a black box NLP ML model's local behavior by identifying the important tokens in a given document that contribute towards or against a specific prediction from the model. These explanation techniques evaluate the behavior of an NLP ML model on a given target document by exploring how different combinations/subsets of the tokens in the target document affect the model's predictions. By limiting the analysis to tokens within a single document, these methods significantly reduce the number of possible input combinations to evaluate for importance. For example, if a target document only contains 15 words, then the combinations of tokens that need to be evaluated are limited to combinations of these 15 words.

To approximate a global explanation for an NLP ML model, LIME and SHAP contain extensions to aggregate multiple local explanations (e.g., local explanations for all of, or a subset of, the documents in the training dataset of the black box ML model) into a single global explanation. The key idea here is that tokens which tend to be locally important across multiple individual documents are likely to be globally important for the model across all documents. These aggregate versions of the LIME and SHAP explainers are referred to herein as Agg.LIME and Agg.SHAP.

These aggregate local explanation techniques suffer from poor runtime performance given that it can be very time consuming to compute the local explanations for all documents in a training dataset. The poor performance may be mitigated by using local explanations from only a subset of the training dataset documents. However, using only a subset of the training dataset documents gives rise to stability issues (especially if the documents to be included in the analysis sample are identified at random) in that repeated generation of global explanations on the same dataset can result in very different explanations. These aggregate local explanation techniques also generally produce low-quality explanations because the local, and hence global, explanations frequently mark unimportant tokens as important (e.g., the explanations contain long lists of words, many of which are obviously unimportant to a human).

Recently, model-specific techniques to explain the inner mechanisms of deep NLP ML models have attracted more attention. Examples of such techniques include: edge probing, which explains contextualized word embeddings; influence functions, which provides explanations for differentiable models; and introspective explanations, which provide targeted techniques to explain Bidirectional Encoder Representations from Transformers (BERT) and recurrent neural network (RNN) models. Despite the improved capabilities of these techniques, they are all examples of model-specific approaches.

HEIDL is another NLP explanation technique that brings the human into the loop by allowing them to review the internal rules of natural language labels generated by a deep learning model trained on human-labeled data. However, HEIDL requires a large amount of computational resources, as well as human effort, and is also dependent on the type of ML model being explained.

The above-indicated challenges limit the practicality of using existing MLX techniques for model-agnostic global MLX used to explain the global behavior of arbitrary NLP ML models. Thus, it would be beneficial to provide an efficient, scalable, stable, and accurate model-agnostic global explanation technique that can explain the global behavior of arbitrary NLP ML models.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 5 is a block diagram that illustrates a computer system upon which an embodiment may be implemented.

FIG. 6 is a block diagram of a basic software system that may be employed for controlling the operation of a computer system.

DETAILED DESCRIPTION

Figure 1:
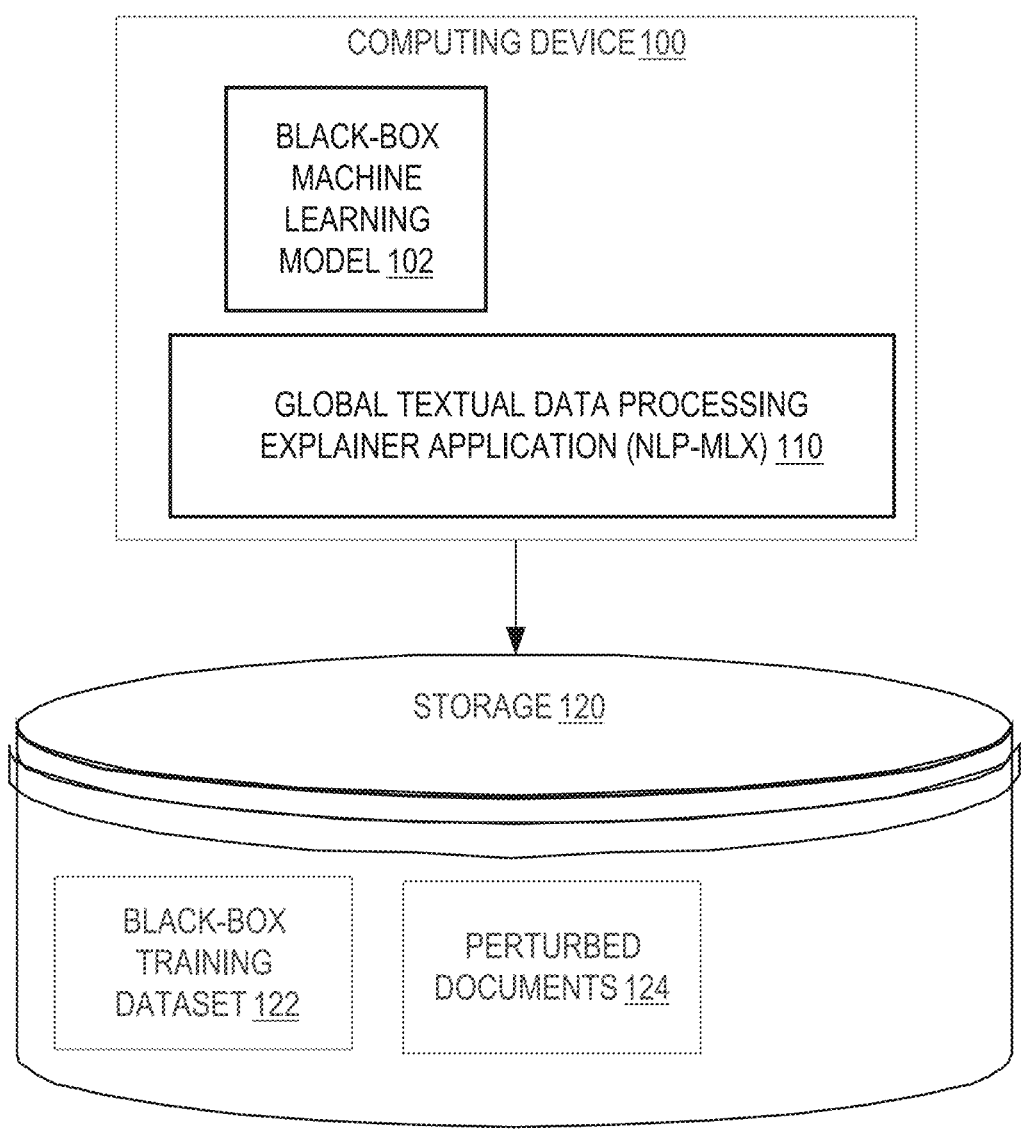
FIG. 1 depicts a block diagram of an example computing device running a global textual data processing explainer application that produces global, model-agnostic explanations for NLP ML models.

In the following description, for the purposes of explanation, numerous specific details are set forth in order to provide a thorough understanding of the techniques described herein. It will be apparent, however, that the techniques described herein may be practiced without these specific details. In other data samples, well-known structures and devices are shown in block diagram form in order to avoid unnecessarily obscuring the techniques described herein.

General Overview

A model-agnostic global explanation technique ("NLP-MLX") for NLP ML models, including NLP ML models implementing classification tasks, regression tasks, clustering tasks, etc., is described herein. NLP-MLX is configured to explain the global behavior of arbitrary NLP ML models by identifying globally important tokens, within a textual dataset, for any given NLP ML model. Further, NLP-MLX is able to accommodate any arbitrary combination of training dataset pre-processing operations used by the NLP ML model.

NLP-MLX is a multi-stage process with two main inputs (the textual dataset basis for explanation, and the trained black box ML model to be explained), which includes four main stages:

Text Analysis: This stage processes the textual documents of the dataset and converts text in each document into a tokenized format. According to an embodiment, tokenization is configurable at the character, word, n-gram, sentence, or paragraph level.

Token Extraction: This stage uses a set of heuristic pre-processing techniques based on one or both of NLP ML model predictions and/or the data distribution for the dataset to efficiently pre-filter the complete list of tokens (from the text analysis stage) into a smaller set of candidate tokens. The identified candidate tokens comprise candidate important tokens (i.e., tokens that are expected to be important or influential to the model), and, according to an embodiment, may also include candidate neutral tokens (i.e., tokens that are expected to be unimportant to the model).

Perturbation Generation: This stage applies a systematic approach for perturbing tokens within documents of the dataset to help evaluate the effect of different candidate tokens, and combinations of tokens, on the model's predictions. The described token-perturbation generation technique for textual datasets produces a small and high-quality set of perturbed documents. Token perturbation is evaluated from multiple different perspectives, such as removing candidate important tokens, inserting candidate important tokens, and replacing candidate important tokens within documents of the dataset to evaluate the true impact of a given token on the model's predictions.

Token Evaluation: Using the black box NLP ML model, this stage performs inference on the perturbed documents (from the perturbation generation stage) and evaluates the true impact of each candidate token (identified by the token extraction stage) relative to predictions associated with for the original documents.

Based on this multi-stage technique that identifies and evaluates candidate important tokens, NLP-MLX addresses limitations evident in other global model-agnostic MLX techniques for NLP ML models with respect to at least performance, quality of resulting explanations, and stability of explanations across runs. In fact, experiments show that NLP-MLX achieves higher explanation quality, in terms of fidelity and accuracy, and performance improvement compared to prior solutions. Furthermore, NLP-MLX supports both supervised and unsupervised NLP ML models, where none of the existing perturbation-based techniques handle unsupervised models.

Performance: Using token extraction techniques described herein, NLP-MLX reduces the cost of producing global explanations for NLP ML models based on reducing the token perturbation search space by pre-filtering nonpromising tokens. This reduction of the search space significantly reduces the number and combination of tokens that need to be evaluated to explain an NLP ML model, thereby limiting the scope of work required for the expensive perturbation and evaluation stages. The reduced search space also enables NLP-MLX to scale to much larger datasets that include a variety of tokens, which is challenging for existing solutions. Also, NLP-MLX scales well with large amounts of data, such that the explanation quality produced by NLP-MLX continues to improve with more data without significantly impacting runtime performance.

Quality: The systematic token filtering (token extraction stage) and algorithmic token perturbation processes (perturbation generation stage) in NLP-MLX quickly prune unimportant tokens and efficiently evaluate the impact of candidate important tokens to improve the quality and interpretability of NLP model explanations. Using these techniques, NLP-MLX improves explanation quality over existing solutions by identifying a set of important tokens that more strongly influence the ML model's predictions compared to those identified by existing solutions. Furthermore, the systematic perturbation process allows NLP-MLX to avoid evaluating out-of-distribution documents, which further increases the quality of resulting explanations. Also, the flexible API used by embodiments of NLP-MLX allows users to swap out nearly every internal processing stage (including the preprocessor or tokenizer) of the explainer with the training dataset pre-processing stages used for the black box NLP-ML model to further improve the explanation quality. For example, a default internal vectorizer used by NLP-MLX can be replaced with a trained vectorizer used by the black box ML model that is being explained, which can further improve the quality of the explanations.

Stability: By considering an initially-limited set of candidate important tokens and replacing them with neutral or meaningless tokens, NLP-MLX reduces the likelihood of generating perturbed documents that are similar to the original documents (e.g., replacing tokens with synonyms), misleading (e.g., unimportant tokens are evaluated together with important tokens), or out-of-distribution (e.g., documents that contain unlikely combinations of tokens). In other words, the limited, but high-quality and selective perturbation used by NLP-MLX contributes to producing stable and repeatable explanations for NLP ML models. Furthermore, because the candidate important tokens are selected from the entire dataset, NLP-MLX explanations are reproducible (within a small margin of error) across runs.

Textual Data Processing ML Models

FIG. 1 depicts a block diagram of an example computing device 100 running a global textual data explainer application (NLP-MLX application) 110 that produces global explanations for NPL ML models (such as for black box ML model 102) based on any machine learning classifier or regressor (i.e., model-agnostic), according to techniques described herein. Computing device 100 is communicatively connected to persistent storage 120, which includes a training dataset 122 comprising a plurality of textual data samples. The system depicted in FIG. 1 is used to explain techniques described herein; however, embodiments are not limited to the system configuration depicted in FIG. 1.

To support textual datasets, there are a variety of preprocessing steps that may be used to prepare documents in a training dataset for input to an NLP ML model. For example, techniques such as segmentation, tokenization, and co-reference resolution may be used to convert text in textual documents into a tokenized structured format that can be more effectively consumed by the NLP ML model. The combination of textual data preprocessing steps and NLP ML model is referred to herein as the textual data processing pipeline.

Figure 2:
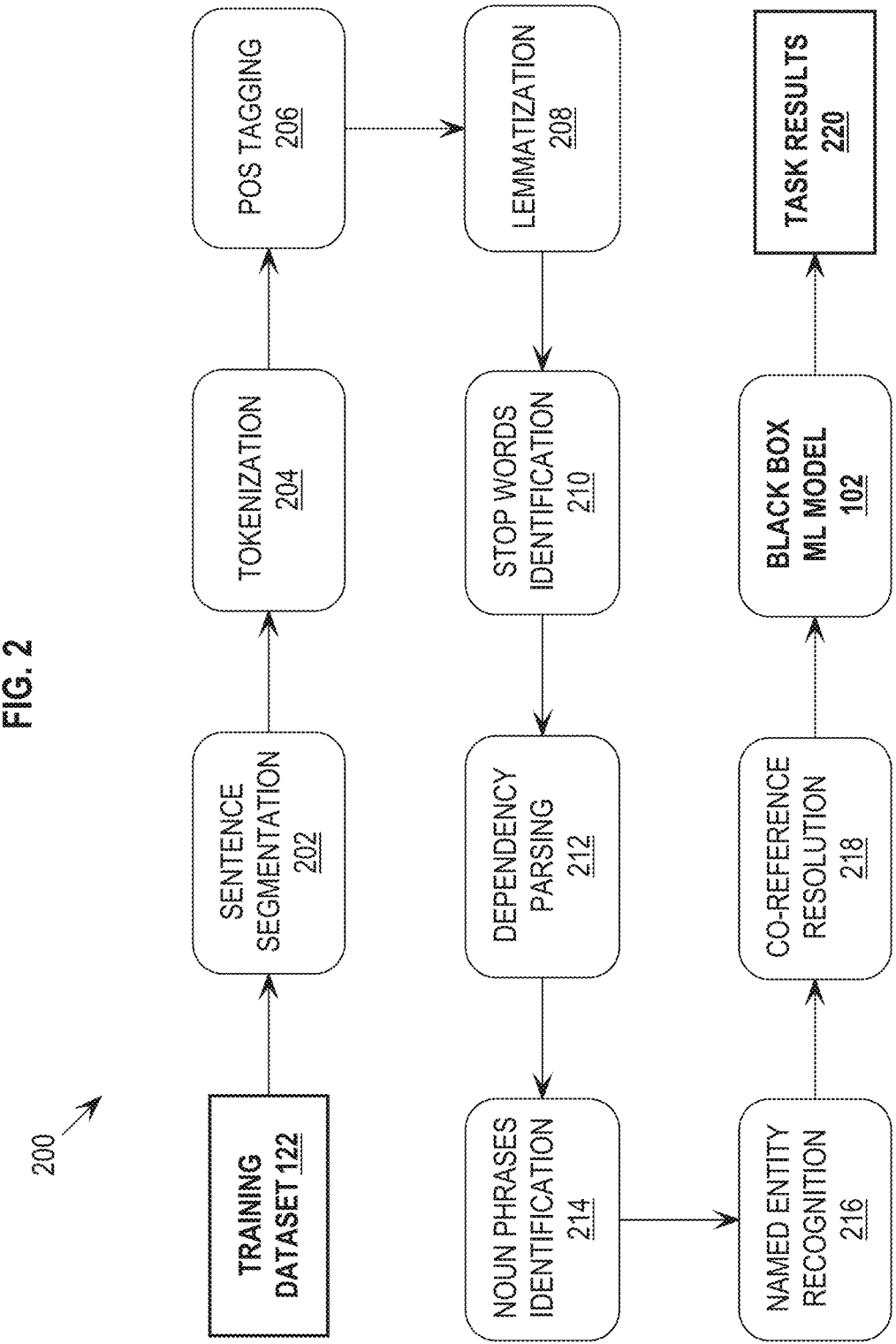
FIG. 2 depicts an example textual data processing pipeline.

An example textual data processing pipeline 200 is depicted in FIG. 2. Pipeline 200 includes the following example text data preprocessing steps: sentence segmentation 202, tokenization 204, Part of Speech (POS) tagging 206, lemmatization 208, stop words identification 210, dependency parsing 212, noun phrases identification 214, named entity recognition 216, and co-reference resolution 218. According to an embodiment, one or more of these example pre-processing steps are used to prepare training dataset 122 to train black box ML model 102.

The process of explaining NLP ML models is further complicated by needing to understand which part(s) of the textual data processing pipeline should be evaluated. For example, the entire textual data processing pipeline could be considered as the black box ML model to be explained, or, alternatively, only a subset of the stages could be considered as the black box ML model to be explained. This decision can have a large impact on the complexity of factors that are required to be considered by the explanation technique with a correlated increase or decrease in quality of the resulting explanations.

Moreover, NLP-MLX application 110 supports textual data classification, regression, and clustering tasks. According to embodiments herein, a prediction associated with a dataset instance refers to a category of observation in the model's perspective (i.e., predicted value from the model), independent of being supervised or unsupervised. For example, in regression tasks, there is only a single output being predicted from the model. For multi-target prediction classification tasks, the prediction probability of each prediction class is considered independently. Furthermore, in all the stages of the pipeline, clustering (unsupervised tasks) is treated like classification, where the explainer utilizes output of the black box ML model as the predictions associated with the dataset instances.

There are a large number of different types of tasks in the context of NLP or text data mining. Each of these tasks may be performed by textual data processing pipelines with different preprocessing stages, NLP ML models, and types of outputs generated by the pipelines. According to an embodiment, NLP-MLX application 110 is configured to produce explanations that address the decision logics of the textual data processing pipeline based on both the inputs and outputs of the pipeline, in the context of a specific NLP task being performed by the pipeline, in a way that is understandable to humans.

Global NLP ML Model Explainer Application

NLP-MLX uses tokens (which may identify particular characters, words, phrases, sentences, etc. of a textual dataset) to generate global explanations for NLP ML models. Embodiments are described herein as based on word-delineated tokens, but embodiments are not limited thereto.

NLP-MLX application 110 is configured to implement the end-to-end model-agnostic global explanation techniques described herein. Specifically, principles of perturbation importance are applied to tokens of textual data by NLP-MLX application 110 to produce global explanations of NLP ML models. It is noted that perturbation of tokens of textual data is not straight-forward given that textual data does not include the notion of features to shuffle, as performed by PI described above. Because tokens of text data in textual documents are not organized into features, there are orders of magnitude more options for token perturbation in textual documents than is possible for feature-based data. Furthermore, not all token perturbation possibilities are equally useful in that some possible token perturbations could completely change the meaning of text within perturbed documents in an unpredictable way, or could result in out of distribution data combinations, or may not provide any useful information at all.

Figure 3:
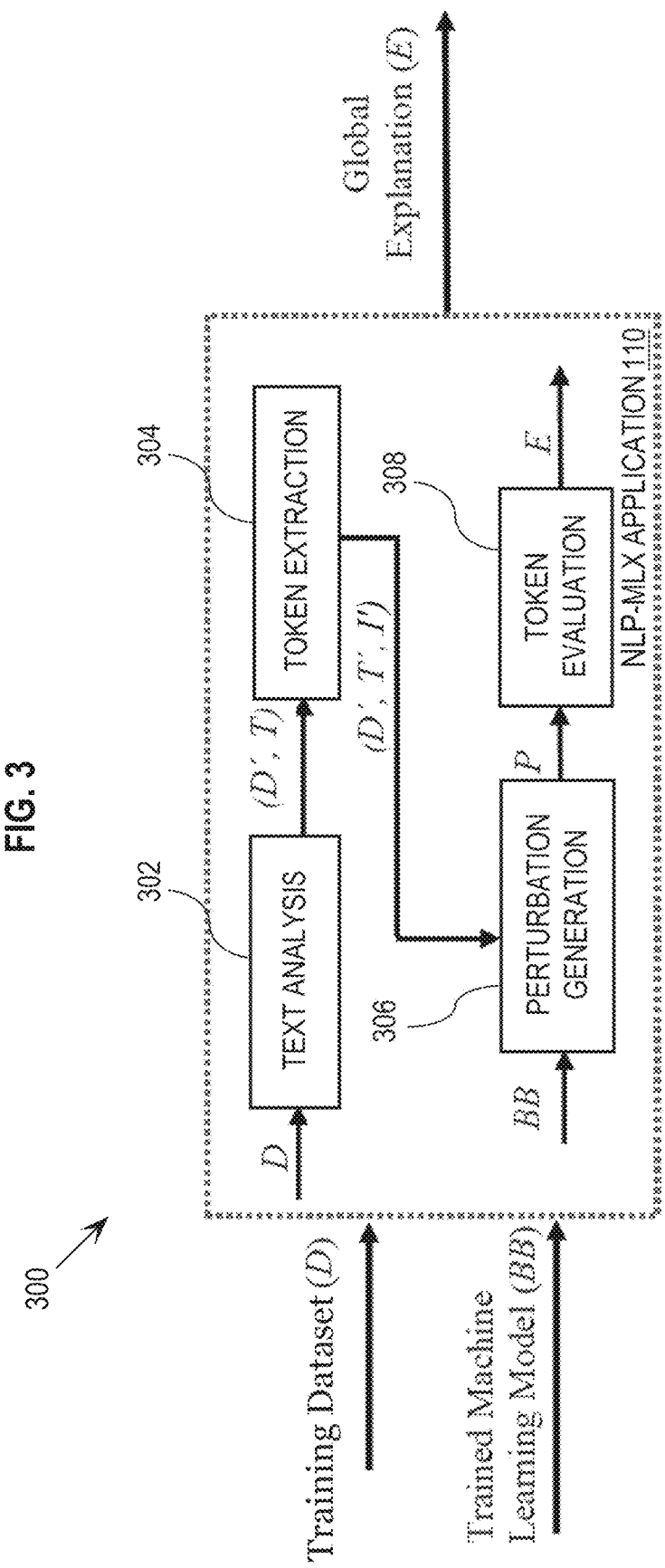
FIG. 3 depicts an end-to-end overview flowchart of a global model-agnostic NLP ML model explainer application.

NLP-MLX application 110 controls token perturbations to ensure that the perturbations provide meaningful data that is useful to identify important explainer tokens within the dataset. FIG. 3 depicts an end-to-end overview flowchart 300 describing the functionality of NLP-MLX application 110. For example, NLP-MLX application 110 performs operations for stages 302-308 of flowchart 300 (i.e., text analysis stage 302, token extraction stage 304, perturbation generation stage 306, and token evaluation stage 308) to generate a global explanation for a black box ML model, e.g., black box ML model 102 (FIG. 1).

As shown in FIG. 3, there are two main inputs to NLP-MLX application 110; the dataset, D, on which the global explanation is to be based, and the black box NLP ML model, BB, to be explained. According to an embodiment, BB includes one or more portions of a textual data processing pipeline (such as pipeline 200 of FIG. 2) used to pre-process textual data in the training dataset for the target black box ML model, where the one or more portions of the pipeline represented by BB may contain any number or types of text data preprocessing steps. For example, NLP-MLX application 110 treats the entire textual data processing pipeline as a black box ML model to be explained. For the remainder of the description of flowchart 300 herein, pipeline 200 (which includes black box ML model 102) is used as an example illustration of the BB input to NLP-MLX application 110. However, any portion of the pipeline (ending with an ML model) may be considered to be the BB input to NLP-MLX application 110, e.g., only black box ML model 102, or black box ML model 102 and less than all of text data preprocessing steps 202-218, etc.

According to an embodiment, example black box ML model 102 is a supervised model that has been trained based on training dataset 122 stored in storage 120 (FIG. 1), which comprises a set of textual data samples (documents), each of which comprises text data and is associated with a label indicating an expected prediction for the document. Example illustrations of NLP-MLX application 110 are described herein as using training dataset 122 (D) to produce an explanation for pipeline 200 (BB). Nevertheless, the documents of the dataset (D) on which NLP-MLX bases an explanation of a black box ML model may or may not be associated with labels of target predictions. Thus, if the black box ML model is a supervised model and at least a portion of the training dataset (with labels) is available to NLP-MLX application 110, NLP-MLX can take advantage of the dataset labels to enhance the fidelity of the black box ML model explanation. However, if the training dataset is not available, or the black box ML model is an unsupervised model (that was trained on an unlabeled dataset), NLP-MLX can use the predictions of the black box ML model for the dataset documents in D to generate a global explanation for the BB.

It is noted that existing feature permutation techniques, such as PI, do not support unsupervised tasks because they consider the target labels when computing the change in the model's score as a result of perturbing a given feature. However, as indicated above, NLP-MLX application 110 can be configured to consider the raw prediction output of the black box NLP ML model when computing the impact of a given token on the model's predictions, as described in further detail below. This enables NLP-MLX application 110 to also support explaining unsupervised tasks, which do not have labeled datasets.

According to an embodiment, if no portion of the training dataset for BB is available to NLP-MLX application 110, the dataset D on which the explanation of BB is based has similar characteristics to the training dataset to facilitate generation of an accurate explanation of the model. To illustrate, a black box model that is trained based on a training dataset ($D_1$) may then be applied to any other arbitrary dataset ($D_2$). The assumption in applying the trained ML model to $D_2$ is that $D_2$ conforms to the same (or similar) data distribution as the training dataset $D_1$, given that unforeseeable statistical property changes in a test dataset with respect to the training dataset may hugely influence the predictions by the ML model in unforeseeable ways.

Assume that NLP-MLX application 110 is called upon to explain the behavior of this example black box ML model based on a dataset $D_2$ without using the training dataset $D_1$. If $D_2$ conforms to the same data distribution as training dataset $D_1$, then NLP-MLX application 110 is able to produce a global explanation of the example black box ML model based on $D_2$ that is comparable to an explanation that would be produced using training dataset $D_1$. However, if $D_2$ does not conform to the same data distribution as training dataset $D_1$, then having access to $D_1$ in the token extraction phase of NLP-MLX helps NLP-MLX application 110 to produce higher-quality explanations because the tokens are extracted from the training dataset that was used to train the black box ML model. However, in the absence of $D_1$, NLP-MLX application 110 performs all phases shown in FIG. 3 based on the available dataset $D_2$.

According to an embodiment, flowchart 300 is initiated when NLP-MLX application 110 receives a request, e.g., to explain the global functioning of pipeline 200. According to an embodiment, the request includes information identifying training dataset 122 (D), and pipeline 200 that includes black box ML model 102 (BB).

Text Analysis Stage

At text analysis stage 302, NLP-MLX application 110 performs text analysis by generating a token corpus for training dataset 122 (D). Specifically, given that ML algorithms generally operate on a numeric feature space, NLP-MLX application 110 transforms text data in the textual documents of D into a structured numerical representation. This is a process of feature extraction (identifying features from textual data), also called vectorization. Accordingly, text analysis stage 302 generates a set of token-based vectorized documents, D', from the raw set of documents in the received dataset D. D' includes a full token set T, which, according to an embodiment, includes all words found in the text data of dataset D.

According to an embodiment, by default, text analysis stage 302 uses an n-gram (e.g., 1-gram) Term Frequency-Inverse Document Frequency (TFIDF)-based vectorizer to embed and vectorize the documents. (For additional information about TFIDF, see Hand, David J., and Niall M. Adams. "Data Mining." Wiley StatsRef: Statistics Reference Online (2014): 1-7—referred to herein as the "TFIDF Reference", which is incorporated by reference as if fully set forth herein.)

It is noted that the way that text is processed and tokenized affects the units of data that the ML model works over. The more similar that the tokenization being used for the explainer is to the tokenization used for the ML model, the more likely that analysis of those tokens for the explainer will be faithful to the actual functioning of the ML model. Accordingly, NLP-MLX application 110 is fully flexible to take advantage of any provided information (e.g., in the request to produce a global explanation for pipeline 200) about the internal text preprocessing stages of BB. Thus, according to an embodiment, NLP-MLX application 110 receives information regarding one or more data analyzers and/or one or more vectorizers used by BB, or partial information that represents an incomplete portion of the text processing pipeline encompassed by BB, such as identification of a tokenizer, or a list of stop-words, etc. Providing NLP-MLX application 110 with details of the text processing pipeline used by BB helps to improve the explanation quality by allowing NLP-MLX application 110 to utilize the same data format as used by BB.

Token Extraction Stage

Because of the high computational complexity and high probability of evaluating out-of-distribution documents, perturbing all the extracted tokens, T, from the full dataset to find the token importance is impractical. For example, there may be hundreds or thousands of tokens in the input documents. Many of these tokens will be unimportant, while a few will be very important to the model's predictions. Evaluating all combinations of tokens is very time consuming, and approximating the full perturbation, for example, by perturbing random subsets of tokens does not guarantee that the truly important tokens will be identified. Thus, before token perturbation, NLP-MLX application 110 applies token extraction stage 304 to the full token set T to pre-filter the full set of tokens into a smaller set of candidate tokens that are most likely to be relevant for generation of the model explanation.

Specifically, once the set of token-based vectorized documents, D', is generated from D, at token extraction stage 304, NLP-MLX application 110 performs token extraction by utilizing a systematic algorithm to reduce the token search space to a smaller, statically-sized set of the most promising (candidate) explainer token candidates. Candidate important tokens are tokens that are most likely to be important tokens that impact the model's decisions. It is noted that evaluating a static number of tokens from the full token set may lead to an exaggerated estimation of tokens' importance, especially in the presence of datasets comprising a relatively diverse set of tokens. Increasing the size of the initial token evaluation set results in a trade-off of quality and runtime performance. As such, according to an embodiment, the number of candidate important tokens extracted at stage 304 is configurable by an administrator, e.g., the administrator indicates that 5% of the most promising tokens should be evaluated using perturbation to determine whether they are important tokens, as described in detail below.

Neutral tokens (including seen neutral tokens identified from document set D and/or unobserved (nonsense) tokens such as "untk") are irrelevant with respect to the black box ML model's decisions, and are used during perturbation generation stage 306, as described in further detail below. Thus, according to an embodiment, at token extraction stage 304, NLP-MLX application 110 extracts a set of candidate neutral tokens from the full set of tokens T in addition to extracting the set of candidate important tokens. According to an embodiment, use of neutral tokens by NLP-MLX application 110 is a configurable feature, i.e., one or both of neutral tokens and unobserved tokens may be used for token perturbation. Thus, token extraction stage 304 filters the token corpus created by the text analysis stage 302, T, into at least a smaller set of candidate important tokens (T'), and, when required, into a smaller set of candidate neutral tokens (I'). In the description below, both candidate token sets are described.

According to an embodiment, token extraction stage 304 is based on token-target relations, including one or both of: (a) relationships between tokens and labels of dataset D indicating the target predictions for the data samples, if present, or (b) relationships between tokens and predictions from the black box ML model. If the full token set is too aggressively filtered during token extraction, it is possible to inadvertently omit evaluation of some of the actually important tokens in the full token set. Thus, according to an embodiment, token extraction stage 304 conservatively selects an initial set of candidate tokens to be evaluated in the subsequent phases of flowchart 300 based on their true impact on model's decisions.

According to an embodiment, token extraction stage 304 uses one or both of the following techniques: Token Distribution Analysis and Vector-based Token Selection. Token Distribution Analysis outputs a small subset of significant tokens based on their frequencies in one target prediction (e.g., a specific target class in a classification task, a specific range of values in a regression task, or a specific cluster in a clustering task) versus another target prediction, while Vector-based Token Selection applies a feature selection technique on the vectorized dataset to find the most relevant tokens corresponding to the model output. If both techniques are used, the results of Token Distribution Analysis and Vector-based Token Selection are aggregated to generate the final set of important tokens (T') and neutral tokens (I'):

$$T^1 = \{T'_1, T'_2\}, I = \{I'_1, I'_2\}.$$

Token Distribution Analysis

Statistically speaking, if the distribution of specific tokens in T differs from one prediction to another, these tokens are more likely to influence the black box ML model's internal decision-making process. For example, the term "NASA", which is highly related to the context of "Space" in comparison to the context of "Medicine", is very likely to play an important role in classifying documents that may belong to these two classes.

Thus, Token Distribution Analysis in token extraction stage 304 identifies token distribution differences from the input dataset D between predictions associated with the dataset documents. These predictions may be target predictions indicated by labels associated with the documents, and/or predictions by BB for the documents of the dataset. According to an embodiment, Token Distribution Analysis computes two lists of tokens: (1) $T'_1$—the tokens that are likely to be most relevant to some corresponding predictions, and (2) $I'_1$—the tokens that are likely to be least relevant to some corresponding predictions.

According to an embodiment, NLP-MLX application 110 utilizes TFIDF for Token Distribution Analysis, as described in the TFIDF Reference indicated above. A TFIDF value measures how relevant a token is to one or more target documents (such as the set of documents associated with a particular prediction) in a collection of documents (such as the entire dataset D) based on how often the token appears in the one or more target documents and how common the token is within the rest of the collection of documents. A TFIDF value approaches 0 when the token is not unique to the one or more target documents (e.g., the token is found across documents associated with many predictions) and approaches 1 when the token is concentrated in the one or more target documents and is generally not found within documents, in the collection, other than the one or more target documents. Thus, the TFIDF value for a given token with respect to a set of documents associated with a particular prediction, in light of the entire dataset D, provides prediction-wise information about the distribution of that token within the dataset.

An example overview of Token Distribution Analysis using TFIDF is described below:
1. Create a new dataset $D'_C=[l_1, \ldots, l_M]$, which includes a list of tokens ($l_j$) corresponding to each prediction ($c_j$) for documents in D'. Each list of tokens is extracted from all of the documents associated with the specific prediction, $c_j$, in D'. M is the total number of predictions in D', and j is the prediction index.
2. For each token in the transformed dataset ($t_i \in T$):
   a. For each prediction in the new dataset ($D'_C$), compute $\text{tfidf}_{t_i,c_j}$:

$$\text{tfidf}_{t_i,c_j} = \text{freq}_{t_i,c_j} \times \text{inv\_freq}_{t_i,D'}$$

where $\text{freq}_{t_i,c_j}$ is the frequency of token $t_i$ within the documents associated with the specific prediction $c_j$, and where $\text{inv\_freq}_{t_i,D'}$ is the inverse frequency of token $t_i$ within the documents of dataset D'. The term $\text{freq}_{t_i,c_j}$ is higher the more common token $t_i$ is within the documents associated with the specific prediction $c_j$ (e.g., the raw count of instances of token $t_i$ within the documents associated with the specific prediction $c_j$). The term $\text{inv\_freq}_{t_i,D'}$ approaches 0 the more common token $t_i$ is within the documents of dataset D' (e.g., dividing the total number of documents of dataset D' by the number of documents that contain token $t_i$, and calculating the logarithm of the result).
   b. Find the prediction-specific differences ($\delta_{i,c_j}$) of the computed tfidf values:

$$\delta_{i,c_j} = \text{tfidf}_{t_i,c_j} - (\Sigma_{m \neq j} \text{tfidf}_{t_i,c_m}/(M-1))$$

3. For each prediction ($c_j$):
   a. $T'_j$ (the set of candidate important tokens)=the top k tokens with the maximum $\delta_{i,c_j}$ values, where k is a configurable number of tokens to include in the set of candidate important tokens.
   b. $I'_j$ (the set of candidate neutral tokens)=the bottom k' tokens with the minimum $\delta_{i,c_j}$ values, where k' is a configurable number of tokens to include in the set of candidate neutral tokens.
4. For all predictions, aggregate the candidate important token sets and the candidate neutral token sets:

$$T'_1 = \bigcup_{j=1}^{M} T'_j, \quad I'_1 = \bigcup_{j=1}^{M} I'_j$$

Furthermore, other techniques that can compute document-based token differences could also be used for Token Distribution Analysis according to embodiments, such as token weighting techniques, vectorization techniques (e.g., semantic vectors), and categorical-categorical association analysis (e.g., Cramer's V). It is worth noting that regression-related tasks can be handled through the same procedure indicated above, where the Token Distribution Analysis technique described above (e.g., TFIDF) is replaced with appropriate techniques to handle numerical targets, such as categorical-numerical correlation analysis techniques (e.g., ANOVA correlation coefficient or Kendall's rank coefficient). (For additional information about categorical-categorical association analysis and categorical-numerical correlation analysis, see Akoglu, Haldun. "User's guide to correlation coefficients." Turkish journal of emergency medicine 18.3 (2018): 91-93—referred to herein as the "Correlation Coefficients Reference", which is incorporated by reference as if fully set forth herein.)

Vector-Based Token Selection

According to an embodiment, another technique for identifying candidate tokens for further analysis is Vector-based Token Selection, which utilizes one or more feature selection techniques that are designed to find highly decisive tokens based on token-target associations. On this basis, performing token selection based on the predictions associated with documents of dataset D' (e.g., labels associated with the documents in the dataset, or predictions generated using BB based on the documents in the dataset) provides information used to identify tokens that are likely to be most influential (and, when needed, least influential or neutral) to the decisions of the black box ML model. Thus, Vector-based Token Selection identifies the most relevant or neutral tokens corresponding to the predictions associated with individual documents.

There are a variety of feature selection techniques that can be applied for Vector-based Token Selection. According to an embodiment, Vector-based Token Selection utilizes Chi-squared association analysis, described in the Correlation Coefficients Reference, to compute two lists of tokens: $T'_2$ (the candidate important tokens), and $I'_2$ (the candidate neutral tokens). It is noted that regression-related tasks can be considered as a single-target prediction task and any arbitrary regression-based feature selection technique (such as Pearson correlation analysis described in the described in the Correlation Coefficients Reference, or mutual information analysis) is applicable.

An example overview of Vector-based Token Selection using Chi-squared association analysis for an ML model that produces classification predictions is described below; it is noted that the Chi-squared technique is also applicable for regression tasks (e.g., using a threshold for distinguishing between predictions):
1. For each class $c_m \in C_{1 \ldots M}$:
   a. Create a new vectorized dataset with the documents of document set D', in which the original predictions ($C_{pred}$) are replaced with predictions ($C'_{pred,m}$). (Note that the process of binarization is skipped if the original task involves binary predictions.) In this process, the documents that are associated with the prediction $c_m$ are assigned to one class and the rest of the documents are assigned to another class. M and N are the total number of predictions of the black box ML model and documents, respectively.

$$C'_{pred,m} = \{c'_j\}_{j=1}^{N} \, \bigg| \, c'_j : \begin{cases} 1 & \text{if } c_j = c_m \\ 0 & \text{else} \end{cases},$$

b. For each token ($t_i \in T$)
      i. Compute the Chi-squared association between the token and the predicted class.

$$\chi^2_{t_i,m}(t_i, C_{pred,m})$$

ii. The set of important tokens, $T'_m$=Top k tokens with the largest values $\chi^2_{t_i,m}$.
      iii. The set of neutral tokens, $I'_m$=Lowest k' tokens with smallest values $\chi^2_{t_i,m}$.

2. Aggregate the token sets:

$$T_2 = \bigcup_{m=1}^{M} T'_m, I_2 = \bigcup_{m=1}^{M} I'_m$$

At a high-level, both Token Distribution Analysis and Vector-based Token Selection modules seem similar; however, they are different in two ways:

Vector-based Token Selection is a more fine-grained process and performs token-target association analysis considering individual document predictions, whereas Token Distribution Analysis considers all of the documents associated with a specific prediction together.

Vector-based Token Selection utilizes the same numerical vector space used by the black box ML model, while Token Distribution Analysis acts in the tokenized domain space.

Perturbation Generation

At stage 306, NLP-MLX application 110 performs perturbation generation, using the set of candidate important tokens, to produce a set of perturbed documents. For example, storage 120 depicted in FIG. 1 includes an example set of perturbed documents 124 generated at perturbation generation stage 306. Specifically, after reducing the list of tokens from T (the complete list of tokens from dataset D) to T'/I' (a subset of candidate important tokens and, when needed, a subset of candidate neutral tokens obtained from token extraction stage 304), perturbation generation stage 306 uses the candidate token set(s) T'/I' to generate a set of perturbed documents (e.g., perturbed documents 124) that are used (at token evaluation stage 310) to evaluate the true impact of the tokens in T' in the context of the black box ML model's predictions. The perturbed documents highlight how decisive a token is in distinguishing documents associated with a specific prediction from documents associated with one or more other predictions.

However, unlike existing feature permutation importance (PI) based approaches for tabular datasets, such as PI, there are many challenges in applying PI in the context of textual datasets. For example, for tabular data, PI evaluates the impact of a specific feature (column in the dataset) by randomly shuffling the feature values. This process approximates the effect of not having the feature by replacing the feature in each data instance with random noise drawn from the same distribution of that feature. In a textual dataset, there is no notion of a feature. Thus, each token (e.g., word) is a candidate for being removed from a given document (data instance) and any token could be added to any document without restriction. Thus, evaluating how all possible combinations of tokens affect the black box ML model's predictions would be prohibitively expensive.

Thus, according to an embodiment, perturbation generation stage 306 implements a novel token perturbation-based approach in the context of textual datasets, which includes one or more of: Token Omission, Context Elimination, and/or Token Insertion.

Token Omission

To implement Token Omission for perturbation generation stage 306, NLP-MLX application 110 removes one or more tokens of the candidate important token set T' from one or more documents of dataset D. Token Omission highlights a token's contribution in its established context within the documents of dataset D. According to an embodiment, NLP-MLX application 110 applies Token Omission to generate a perturbed document for every candidate important token in every document in D. Specifically, for each given document in dataset D, NLP-MLX application 110 generates a respective perturbed version of the given document for each candidate important token in the given document by removing all instances of the target candidate important token from the document.

The following is a summary of the algorithm for Token Omission:

For each token ($t_i$) in the set of candidate important tokens (T'):
   a. Determine the set of documents (D'$_i \subseteq$D), where D is the total set of documents, which include the given token ($t_i \in$T').

$$D'_i = \{\forall d_p \in D | t_i \in d_p\}$$

b. Find all the current token's occurrences (e.g., token indices in D'$_i$)

$$R_{set} = [\forall t_i \in d_p \text{ for } d_p \in D'_i]$$

For example, consider a BB that implements a classification task to predict the weather based on a dataset D that includes a particular document that includes the sentence: "Today is sunny." In this example, the set of candidate important tokens identified at token extraction stage 304 includes the token "sunny". NLP-MLX application 110 generates a perturbed version of the particular document (e.g., to include in perturbed documents 124), in which all instances of the token "sunny" are removed and replaced with a neutral token. According to an embodiment, a neutral token is either (a) one of the candidate neutral tokens identified from dataset D during token extraction stage 304, or (b) a specific unobserved token, such as "untk". The perturbed version of the particular document includes the sentence "Today is untk."

As another illustration based on the example BB above, dataset D further includes a particular document that includes the text: "Yesterday was sunny, and the day before was partly-cloudy. Today is also sunny with a 5% chance of rain." In this example, the set of candidate important tokens identified at token extraction stage 304 includes the tokens "sunny", "cloudy", and "rain". Accordingly, NLP-MLX application 110 generates three perturbed versions of the particular document (e.g., to include in perturbed documents 124), where each perturbed document includes one of the following versions of the text indicated above:

"Yesterday was untk, and the day before was partly-cloudy. Today is also untk with a 5% chance of rain." (Token Omission of the token "sunny".)

"Yesterday was sunny, and the day before was partly-untk. Today is also sunny with a 5% chance of rain." (Token Omission of the token "cloudy".)

"Yesterday was sunny, and the day before was partly-cloudy. Today is also sunny with a 5% chance of untk." (Token Omission of the token "rain".)

Context Elimination

To implement Context Elimination for perturbation generation stage 306, NLP-MLX application 110 isolates a particular candidate important token, of the candidate important token set T', within a given document by replacing all tokens within the document (other than any instances of the particular candidate important token) with neutral tokens. Perturbed documents that are generated based on Context Elimination allow evaluation of the contribution of a target candidate important token outside of the influence of other tokens that form the context of the target candidate important token within a document of the dataset. Thus, Context Elimination helps to balance a token's measured contribution to the predictions of BB based on the impact of the token's context on the model's predictions.

According to an embodiment, NLP-MLX application 110 applies Context Elimination to generate a perturbed document for every candidate important token in every document in D. Specifically, for each given document in dataset D, NLP-MLX application 110 generates a respective perturbed version of the given document for each candidate important token in the given document by replacing all tokens within the document, other than instances of the target candidate important token, with neutral tokens.

The following is a summary of the algorithm for Context Elimination:

For each token ($t_i$) in the set of candidate important tokens (T'):
   a. Determine the set of documents ($D'_i \subseteq D$) that include the given token ($t_i \in T'$), where D is the total set of documents.

$$D'_i = \{\forall d_p \in D | t_i \in d_p\}$$

b. Find all occurrences of tokens in $D'_i$ other than the current token $t_i$.

$$R_{set} = [\forall t_j \in d_p | t_j \neq t_i \text{ for } d_p \in D'_i]$$

c. Generate the new set of perturbed documents (D' P) by replacing $R_{set}$ in the documents of $D'_i$ with one or both of:
      i. one or more randomly selected tokens out of the set of candidate neutral tokens identified during token extraction stage 304 ($t_r \in I'$), or
      ii. one or more unobserved tokens/meaningless tokens for BB, such as 'untk'.

To illustrate, consider the example BB above that implements a classification task to predict the weather based on a dataset D that includes a particular document that includes the sentence: "It doesn't look very sunny today." In this example, the set of candidate important tokens identified at token extraction stage 304 includes the token "sunny". Accordingly, NLP-MLX application 110 generates a perturbed version of the particular document (e.g., to include in perturbed documents 124), in which all tokens, other than instances of the token "sunny", are replaced with neutral tokens. The perturbed version of the particular document includes the sentence "untk untk untk untk sunny untk."

As another illustration based on the example BB above, dataset D further includes a particular document that includes the text: "Yesterday was sunny, and the day before was partly-cloudy. Today is also sunny with a 5% chance of rain." In this example, the set of candidate important tokens identified at token extraction stage 304 includes the tokens "sunny", "cloudy", and "rain". Accordingly, NLP-MLX application 110 generates three perturbed versions of the particular document (e.g., to include in perturbed documents 124), where each perturbed document includes one of the following versions of the text indicated above:

"untk untk sunny, untk untk untk untk untk untk-untk. untk untk untk sunny untk untk untk untk untk untk." (Context Elimination of the token "sunny".)

"untk untk untk, untk untk untk untk untk untk-cloudy. untk untk untk untk untk untk untk untk untk." (Context Elimination of the token "cloudy".)

"untk untk untk, untk untk untk untk untk untk-untk. untk untk untk untk untk untk untk untk rain." (Context Elimination of the token "rain".)

Token Insertion

To implement Token Insertion for perturbation generation stage 306, NLP-MLX application 110 inserts a target candidate important token, of the candidate important token set T', into a given document of dataset D. According to an embodiment, NLP-MLX application 110 inserts the target candidate important token into one or more documents of D that do not already include the target candidate important token. Token Insertion may or may not replace a token in the target document. Such Token Insertion-based perturbed documents allow evaluation of the contribution of the target candidate important token, in a new context, to predictions of BB, where the new context still belongs to the observed dataset distribution (i.e., not a randomly-generated document).

According to an embodiment, NLP-MLX application 110 applies Token Insertion to generate a set of perturbed documents for each candidate important token, of the set of candidate important tokens identified during token extraction stage 304, by identifying a set of target documents, from D, that do not include a target candidate important token. The set of target documents may be (a) all documents in D that do not include the target candidate important token, or (b) a random sampling of documents in D that do not include the target candidate important token, which includes at least one document associated with each known prediction of BB when available. For each target document in the identified set of target documents, NLP-MLX application 110 generates a respective perturbed version of the target document by inserting one or more instances of the target candidate important token into the target document.

According to an embodiment, the number of instances of a given candidate important token that are inserted into a given target document is a random number between the minimum number of times the given candidate important token occurs within a document of dataset D, and the maximum number of times the given candidate important token occurs within a document of dataset D. This random number may also be drawn from a probability distribution of the number of times the given candidate important token occurs within respective documents of dataset D.

Furthermore, according to an embodiment, NLP-MLX application 110 randomly places the identified number of instances of a candidate important token into the text of a given target document. According to another embodiment, NLP-MLX application 110 places the identified number of instances of a candidate important token into the text of a given target document based on the part of speech (POS) of the token. POS-based token placement helps the perturbed documents to have a higher fidelity to the original data distribution because the POS roles of the tokens are used as a basis for inserting the tokens at grammatically correct positions within the perturbed documents.

The following is a summary of the algorithm for Token Insertion:

For each token ($t_i$) in the set of candidate important tokens (T'):
   a. Determine the set of documents, from dataset D, belonging to different predictions by the black box ML model ($D_{-i}$), which do not include the given token ($t_i \notin D_i \rightarrow D_{-i} \cap D_i = \emptyset$).

$$D'_{-i} = \{\forall d_p \in D | t_i \notin d_p\} \rightarrow D_{-i} \cap D_i = \emptyset$$

b. Generate the new set of perturbed tokens ($D'_{-i} \rightarrow P_{2,i}$) by inserting the token $t_i$ in each document ($d_p$) of $D'_{-i}$ by replacing x random selected tokens in the document ($d_r$) with $t_i$. The variable x represents a random number in the range of minimum and maximum occurrence of $t_i$;

$$Min_{freq(ti)} \leq x \leq Max_{freq(ti)}$$

To illustrate, consider the example BB above that implements a classification task to predict the weather based on a dataset D that includes a particular document that includes the sentence: "It's a bit cloudy." In this example, the set of candidate important tokens identified at token extraction stage 304 includes the token "sunny". The particular document does not include any instances of the token "sunny". NLP-MLX application 110 determines that the minimum number of times the token "sunny" occurs within a document of dataset D is one, and the maximum number of times is five. Accordingly, NLP-MLX application 110 generates the following perturbed version of the particular document (e.g., to include in perturbed documents 124), in which the target candidate important token is inserted into the particular document once (a randomly-selected number): "It's a sunny bit cloudy."

As another example, dataset D further includes a second document that includes the text "Yesterday was rainy, and the day before was partly-cloudy. Today, there is a 5% chance of rain.". This document does not include any instances of the token "sunny". NLP-MLX application 110 generates the following perturbed version of the particular document (e.g., to include in perturbed documents 124), in which the target candidate important token is inserted a randomly-selected three times into the particular document. The perturbed version of the particular document includes the text "Yesterday was sunny, and the day sunny before was partly-cloudy. Today, there is a 5% chance of sunny rain."

Token Evaluation

The set of perturbed documents generated at stage 306 are used, at stage 308, to perform Token Evaluation on the set of candidate important tokens T' regarding the relative impacts of those tokens on predictions of BB. Specifically, NLP-MLX application 110 identifies a final set of important explainer tokens by evaluating differences between predictions associated with the original documents in dataset D, and predictions, by the black box ML model 102 of BB, for the perturbed set of documents P (e.g., perturbed documents 124). The key idea is to measure the impact of a given token-of-interest, from T' on the predictions produced by the ML model of BB.

There are multiple different ways that the final token importance of a candidate important token could be computed based on predictions for the original and perturbed documents. As previously described, this process can be supervised (i.e., the perturbation impact is evaluated by considering the original dataset's labels) or unsupervised (i.e., the perturbation impact is computed independently of the original dataset's labels). According to an embodiment, the evaluation process used during token evaluation stage 308 is configurable using one or more classification metrics, such as f1-score, recall, or regression metrics, such as R-squared, mean absolute error, etc.

According to an embodiment, an unsupervised metric ("impact rate") is used to determine the final token importance metric for each candidate important token in T' using the set of perturbed documents 124. The impact rate is defined based on the absolute prediction (probability) changes between the perturbed documents and the base documents of the perturbed documents, rather than on changes in discrete predictions. An example of the overall evaluation process for classification tasks using the impact rate is as follows:

For each token ($t_i$) in the list of candidate important tokens (T'):
1. NLP-MLX application 110 computes the prediction (probabilities), $S_{t_i}$, from the BB model for all basis documents containing the target token $t_i$. For Token Insertion and Token Omission-based perturbed documents, the basis documents are the documents from dataset D on which perturbed documents are based. For Context Elimination-based perturbed documents, the basis documents are the perturbed documents that have replaced the context of candidate important tokens with neutral tokens.
2. NLP-MLX application 110 computes the prediction (probabilities), $S'_{t_i}$, from the BB model for all subsequent-comparison documents for token $t_i$. For Token Insertion and Token Omission-based perturbations, the subsequent-comparison documents are the perturbed documents. For Context Elimination-based perturbations, the subsequent-comparison documents are the documents from dataset D on which perturbed documents are based.
3. NLP-MLX application 110 computes the overall token impact rate, $Imp_{t_i}$, by taking the average difference between $S_{t_i}$ and $S'_{t_i}$ for each pair of basis and subsequent-comparison documents:

$$Imp_{t_i} = avg(S_{t_i} - S'_{t_i})$$

4. NLP-MLX application 110 computes the positive/negative impact rate of token $t_i$ for a specific prediction, for each perturbed document associated with token $t_i$, based on the type of token perturbation used to produce the perturbed document.
    a. For Token Insertion and Context Elimination: A score increase to a given prediction is considered as a positive contribution to the overall final token importance for token $t_i$, and a score decrease is considered as a negative contribution to the overall final token importance for token $t_i$.
    b. For Token Omission: A score increase to a given prediction is considered as a negative contribution to the overall final token importance for token $t_i$, a score increase is considered as a positive contribution to the overall final token importance for token $t_i$.
5. NLP-MLX application 110 computes the overall selectivity metric of the token $t_i$ ($\overline{Imp_{t_i}}$) by aggregating the contributions computed for all perturbed documents associated with token $t_i$. For example, $\overline{Imp_{t_i}}$ is computed as the (weighted) average of the contributions computed for all perturbed documents associated with token $t_i$.

To illustrate, NLP-MLX application 110 generates a global explanation for an example BB that generates binary COLD/WARM classifications. In connection with generating the explanation, NLP-MLX application 110 computes the prediction probability of the classification WARM for documents of D that include the candidate important token "sunny" to be 0.6.

To determine the impact rate of the target token "sunny", NLP-MLX application 110 computes a prediction probability of 0.7 of WARM for context elimination-based perturbed documents for the target token. This updated probability indicates a 0.1 positive impact of the target token "sunny" for a prediction of WARM in absence of its textual context. Furthermore, NLP-MLX application 110 computes a prediction probability of 0.45 of WARM for token omission-based perturbed documents for the target token "sunny", which indicates 0.15 positive impact for a prediction of WARM of the target token in its textual context. Further, NLP-MLX application 110 uses token insertion to insert the target token "sunny" into a set of documents from D with an original prediction probability of 0.3 for a prediction of WARM, where the token insertion-based perturbed documents generated for these documents are computed to have a prediction probability of 0.52 for WARM. This updated probability indicates 0.22 positive impact for a prediction of WARM of the target token in a new context.

Utilizing a non-weighted average of these three scores leads to an overall selectivity metric of about 0.16 for target token "sunny" for a prediction of WARM. Alternatively, weights could be applied to one or more of the component scores to increase or decrease the contribution of those one or more scores to the final selectivity metric.

NLP-MLX application 110 ranks the tokens, of the set of candidate important tokens T', based on their computed selectivity metric, and selects the top n tokens as the final set of important explainer tokens to explain the model's decision-making behavior.

Generated Model Explanation

NLP-MLX application 110 generates explanation information for the black box machine learning model BB that includes the final set of important explainer tokens. Specifically, explanation information for a given black box ML model includes each important token of the final set of important explainer tokens. According to an embodiment, the explanation information further includes one or more values, for each explainer token, that indicate the predicted importance of the associated token to predictions of the model. For example, the one or more values in explanation information for a particular explainer token indicate the overall selectivity metric (e.g., impact rate) computed for the token, a contribution score calculated from one or more of the perturbation techniques (such as a predicted contribution that inclusion of the particular explainer token has toward a one or more predictions for a document that includes the explainer token), etc.

According to an embodiment, the explanation information includes, for each explainer token of the final set of important explainer tokens, one or more visual indicators that visually indicate the predicted importance of the associated token to predictions of the model. Such a visual indication for a particular explainer token may be a portion of a chart or graph that is associated with the particular explainer token, which indicates the relative importance of a token with respect to the importance of other tokens in the explanation information.

Figure 4:
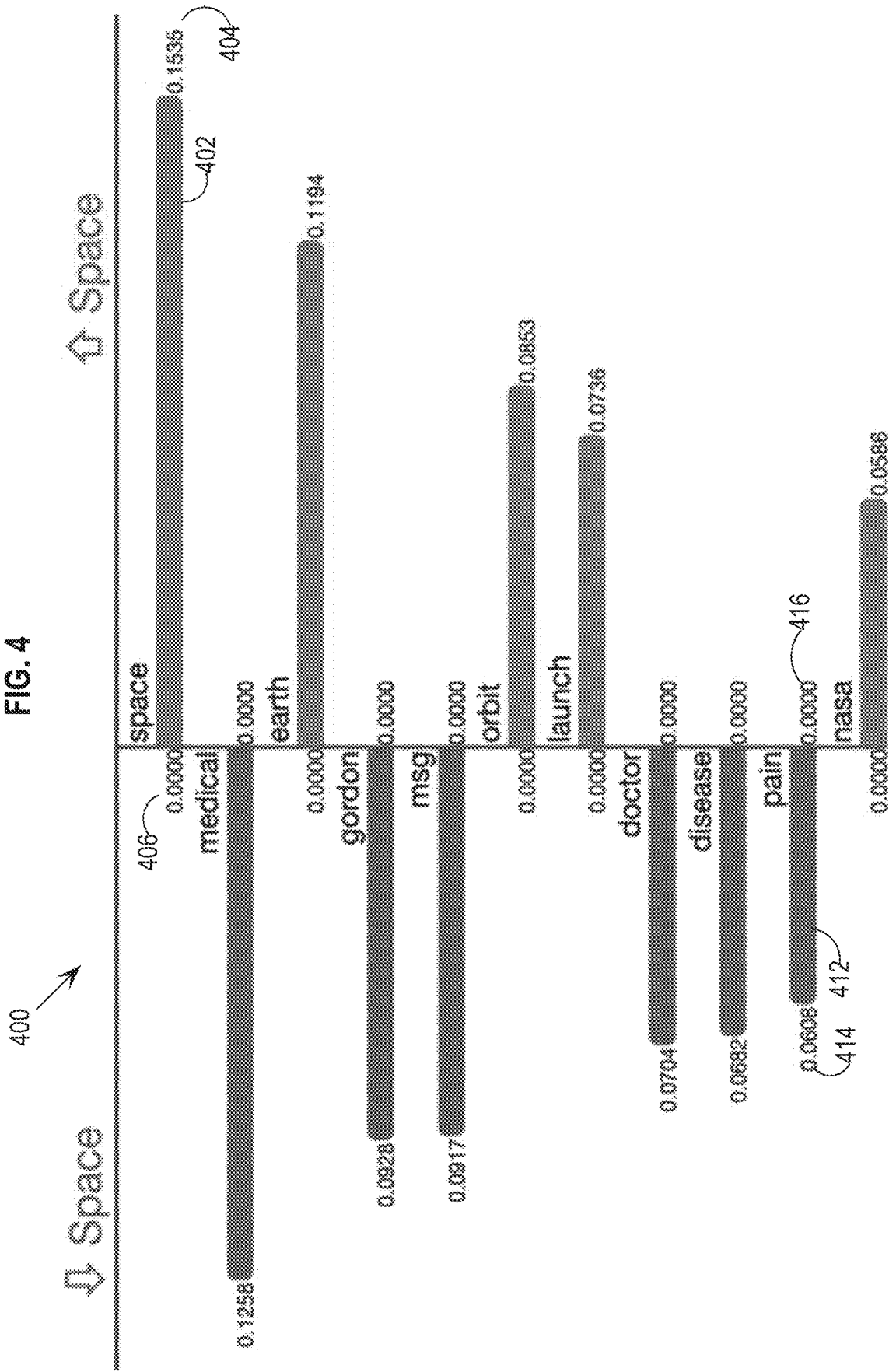
FIG. 4 depicts an example explanation generated by a global model-agnostic NLP ML model explainer.

FIG. 4 depicts example explanation information 400 generated by NLP-MLX application 110 using the impact rate technique described above. Specifically, in this example, NLP-MLX application 110 has identified a final set of explainer tokens for ML model 102 that implements a binary classification task to predict whether a given document is associated with a classification of "SPACE" or is not associated with a classification of "SPACE" (referred to herein as a classification of "NOT SPACE"). The final set of explainer tokens shown in example explanation 400 includes the following set of important explainer tokens: "space", "medical", "earth", "gordon", "msg", "orbit", "launch", "doctor", "disease", "pain", and "nasa".

Furthermore, the example explanation information indicates the relative contributions of the different important explainer tokens toward and against classification of a document as relating to "SPACE". Specifically, each token is associated with two values indicating the contribution of the token toward a prediction of "SPACE" or "NOT SPACE", and a bar (of a bar graph) that illustrates the relative importance of each token. For example, information 400 depicts the prediction of "SPACE" on the right side of a bar graph and the prediction of "NOT SPACE" on the left side of the bar graph. In information 400, the token "space" is associated with a right-facing bar 402 of the bar graph. The token "space" is also associated with a selectivity metric value 404 that measures the contribution of inclusion of the token within a document toward a classification of "SPACE" (i.e., 0.1535), and a second value 406 that measures the contribution of inclusion of the token toward a classification of "NOT SPACE" (i.e., 0.0000). The magnitude of bar 402 and the relatively high value of value 404 indicate that this token has high relative importance toward the classification decision of the black box model.

As another example, the token "pain" is associated with a left-facing bar 412 of the bar graph. The token "pain" is also associated with a selectivity metric value 414 that measures the contribution of inclusion of the token in a document toward a classification of "SPACE" (i.e., 0.0000), and a second value 416 that measures the contribution of inclusion of the token toward a classification of "NOT SPACE" (i.e., 0.0608). The magnitude of bar 412 and the relatively low value of value 414 indicates that this token has lesser relative importance toward the classification decision of the black box model among the important explainer tokens.

Though not shown in explanation information 400 of FIG. 4, it is possible for a token to contribute to multiple predictions. As a non-limiting example, in a classification task with three target classes of [SPORT, POLITICS, WEATHER], the token "running" can positively contribute to both SPORT and POLITICS classes. To illustrate, document set D includes the following example sentences that include the token "running": "Running is the best exercise" (in a document associated with the SPORTS prediction), and "He is running for office" (in a document associated with the POLITICS prediction). NLP-MLX application 110 may analyze these documents (as described in detail herein) and identify "running" as an important token for both the SPORT class and the POLITICS class.

Experiments

In a set of experiments, NLP-MLX application 110 was compared against a global, aggregated version of LIME, referred to herein as Agg.LIME. Agg.LIME first computes local LIME explanations for each document in a target dataset. Then, a global explanation is approximated from the local explanations by aggregating the independent local explanations (e.g., computing the frequency of local documents where a token is the most important, second most important, third most important, and so on).

The results of these experiments showed improvements in explanation runtime, quality, and stability of NLP-MLX application 110 versus Agg.LIME, where the runtime performance evaluation of each dataset was conducted on the same compute engine and under the same conditions. An inherently interpretable ML model was used as the model to explain, where an inherently interpretable model directly provides information regarding feature importance. The explanations derived from the trained ML model were compared with the explanations generated by NLP-MLX application 110 and Agg.LIME.

In the following results summary, the explanation quality is measured by the Recall score, which computes the percentage of significant tokens in the original model, which appear in the list of important tokens detected by the explainers. The Recall of NLP-MLX application 110 resulting from the experiment was 90% (captures 9/10 important tokens), while the Recall of Agg.LIME was only 20% (captures 2/10 important tokens). The runtime of NLP-MLX application 110 was 58 seconds, and the runtime of Agg.LIME was 1343 seconds. These measurements were recorded based on sequential computations of both Agg.LIME and NLP-MLX application 110. It is worth noting that the absolute runtimes of both techniques could be improved via parallelization.

A further experiment evaluated the practicality and scalability of NLP-MLX application 110 as the dataset size increases (in terms of number of documents). In this experiment, a set of XGBoost (XGB) models were trained based on different sizes of a particular dataset. In this experiment, runtime measures the total time to compute the global explanation on the corresponding number of documents, and quality is measured by the Ranged Recall (RR) metric. RR compares the similarity of two lists of ranked features, favoring discretized top-ranked matches more than low ranked ones. Specifically, RR measures the weighted recall of different bins, which allows for fuzzy ordering comparison by removing some importance from specific list ordering. Bins are overlapping and defined from the start of the list to an upper bound (e.g., index 0 to 5, index 0 to 10, etc.). The following formula shows this metric's calculation method in s bins. The reported scores in this study are based on comparing the first 30 ranked tokens in explanations versus reference list. Here, b is the bin size, s is the number of bins, and w are the weights applied to the tokens within a bin (s: 6, b: 5, w: [6, 5, 4, 3, 2, 1]).

$$RR = \sum_{i=1}^{s} w_i \times (pred_{1..b*i} \cap ref_{1..b*i}) \Big/ \sum_{i=1}^{s} w_i$$

In the results of this experiment, the explanation quality (RR) of NLP-MLX application 110 (relative to the XGB model's feature importance) increases as the number of documents increases, whereas the quality Agg.LIME remains relatively constant when provided with more data. This indicates that when NLP-MLX application 110 is provided with more data, it is able to generate a better global explanation than Agg.LIME. Additionally, the runtime performance of NLP-MLX application 110 maintains its efficiency when the dataset size increases (from approximately 37 seconds at 50 documents to 90 seconds at 4000 documents), while the runtime of Agg.LIMF increases linearly with the dataset size (from approximately 64 seconds at 50 documents to 11500 seconds at 4000 documents). This highlights the scalability of NLP-MLX application 110.

Also, the experiments showed that the number of important tokens reported by Agg.LIME can grow very quickly, which is not very intuitive for a human to understand. For example, the final explanations computed by NLP-MLX application 110 contain 60 important tokens, while Agg.LIME contains around 6000 tokens (tokens which have a non-zero weight), which requires further pruning to be interpretable. As such, NLP-MLX application 110 can easily handle more input data and efficiently limit the number of important tokens that are evaluated and presented to the user through the token extraction/filtering stage. Furthermore, experimentation shows that the tokens identified by NLP-MLX application 110 are, in general, actually influential in making decisions regarding predictions by the black box ML model.

Furthermore, to verify the performance of NLP-MLX application 110 in connection with different types of black box ML models, the explanation quality (RR) was evaluated against four inherently interpretable models: Logistic Regression (LR), Decision Tree (DT), Random Forest (RF), and XGB. In these experiments, NLP-MLX application 110 achieves a higher explanation quality (RR) than Agg.LIME across all models and datasets. Also, the average runtime across all black box ML models of NLP-MLX application 110 were 22 and 600 times faster than Agg.LIME on the two utilized datasets, respectively.

Finally, NLP-MLX application 110 was evaluated with regard to stability of explanation across runs. The perturbation process in NLP-MLX application 110 contains inherent randomness (e.g., selecting which tokens to replace, which documents to replace a token's context, etc.). One approach to limit the effects of randomness in NLP-MLX application 110 is to repeat the process for multiple iterations and average the token importance results.

To this end, the explanation quality (RR) of NLP-MLX application 110 was evaluated against the baseline DT token importance for a different number of iterations (1 to 20). This experiment showed that the explanation quality of NLP-MLX application 110 (based on the first 30 tokens) remained relatively stable and did not increase or decrease drastically with the number of iterations. Consequently, NLP-MLX application 110 is able to find a high-quality set of important explainer tokens in only a single iteration.

The main takeaway from these experiments is that the proposed end-to-end global textual data explainer, NLP-MLX application 110, significantly improves performance, quality, and the repeatability of the explanations in comparison to aggregated explanation techniques, such as Agg.LIME.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, the training set for workload/OS models 320 is labeled, by an administrator, with the workload types and/or operating systems running on the server device at the time the historical utilization data was gathered. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACKPROPAGATION THROUGH TIME".

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the dataset. Therefore, the decision trees gain accuracy as the decision trees grow without being forced to over fit the training data as would happen if the decision trees were forced to be restricted to all the feature dimensions of the dataset. Predictions for the time-series are calculated based on the mean of the predictions from the different decision trees.

The following is an example and non-limiting method of training a set of Random Forest models. A best trained Random Forest ML model is selected, from a set of models resulting from the training phase, to be the basis for instances of a trained ML model. In some embodiments, training data is pre-processed prior to labeling the training data that will be used to train the Random Forest ML model. The preprocessing may include cleaning the readings for null values, normalizing the data, downsampling the features, etc.

In an embodiment, hyper-parameter specifications are received for the Random Forest tch ML model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc. The Random Forest ML model is trained using the specified hyper-parameters and the training dataset (or the preprocessed sequence training data, if applicable). The trained model is evaluated using the test and validation datasets, as described above.

According to one or more embodiments, a determination is made of whether to generate another set of hyper-parameter specifications. If so, another set of hyper-parameter specifications is generated, and another Random Forest ML model is trained having the new set of hypermeters specified. All Random Forest ML models trained during this training phase are the set of models from which the best trained ML model is chosen.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method for producing a global explanation for a black box machine learning model that is used to generate predictions for textual documents, comprising:
   tokenizing text data in a plurality of textual documents to produce a plurality of tokens;
   identifying a set of candidate important tokens from the plurality of tokens;
   wherein the set of candidate important tokens is less all of the plurality of tokens;
   for each candidate important token, of the set of candidate important tokens:
      determining a selectivity metric that indicates how selective said each candidate important token is for one or more predictions of a plurality of predictions of the black box machine learning model, and
      responsive to the selectivity metric for said each candidate important token satisfying inclusion criteria, including said each candidate important token in a set of important explainer tokens; and
   generating said global explanation for the black box machine learning model based on the set of important explainer tokens;
   wherein the method is performed by one or more computing devices.

2. The computer-executed method of claim 1, wherein:
   each textual document, of the plurality of textual documents, is associated with an associated prediction of the plurality of predictions; and
   the prediction associated with each textual document, of the plurality of textual documents, is one of:
      generated for said each textual document using the black box machine learning model, or
      based on metadata associated with said each textual document.

3. The computer-executed method of claim 1, further comprising:
   generating a perturbed document based on a particular document of the plurality of textual documents by performing a perturbation operation over a particular candidate important token of the set of candidate important tokens;
   wherein the perturbation operation is one of: token replacement by a neutral token or context elimination;
   wherein determining a particular selectivity metric that indicates how selective the particular candidate important token is for a particular prediction, associated with the particular document, comprises:
      using the black box machine learning model to generate a perturbation prediction for the perturbed document, and
      determining the particular selectivity metric based, at least in part, on whether the perturbation prediction is within a threshold amount of the particular prediction associated with the particular document.

4. The computer-executed method of claim 3, wherein:
   said generating the perturbed document based on the particular document is implemented by performing token omission for the particular candidate important token, of the set of candidate important tokens, within the particular document;
   wherein performing token omission comprises removing, from the particular document, one or more instances of the particular candidate important token to generate the perturbed document.

5. The computer-executed method of claim 3, wherein:
   said generating the perturbed document based on the particular document is implemented by performing context elimination for the particular candidate important token, of the set of candidate important tokens, within the particular document;
   wherein performing context elimination comprises replacing, within the particular document, all tokens, other than one or more instances of the particular candidate important token, with neutral tokens to generate the perturbed document.

6. The computer-executed method of claim 3, wherein:
   said generating the perturbed document based on the particular document is implemented by performing token insertion for the particular candidate important token, of the set of candidate important tokens, within the particular document;
   wherein performing token insertion comprises inserting, into the particular document, one or more instances of the particular candidate important token to generate the perturbed document.

7. The computer-executed method of claim 1, wherein said identifying the set of candidate important tokens from the plurality of tokens comprises, for each prediction of the plurality of predictions:
   identifying a set of tokens, of the plurality of tokens, that occur within a prediction-specific set of documents, of the plurality of textual documents, associated with said each prediction;
   for each token of the set of tokens:
      determining a prediction-specific distribution metric for said each token based on (a) a number of times that said each token occurs within the prediction-specific set of documents associated with said each prediction, and (b) a number of times that said each token occurs within the plurality of textual documents other than the prediction-specific set of documents, and
      responsive to determining that the prediction-specific distribution metric for said each token satisfies an inclusion criterion, including said each token in the set of candidate important tokens.

8. The computer-executed method of claim 7, wherein:
determining a particular prediction-specific distribution metric for a particular token of the plurality of tokens and a particular prediction of the plurality of predictions, comprises:
  determining a plurality of prediction-specific term frequency-inverse document frequency (TFIDF) values for the particular token by, for each prediction of the plurality of predictions, identifying a prediction-specific TFIDF value for said each prediction based on a frequency that the particular token occurs within a prediction-specific set of documents, of the plurality of textual documents, associated with said each prediction,
  wherein the plurality of prediction-specific TFIDF values includes a particular prediction-specific TFIDF value for the particular prediction, and
  calculating the particular prediction-specific distribution metric, for the particular token, based on a difference between (a) the particular prediction-specific TFIDF value for the particular prediction, and (b) an average of the prediction-specific TFIDF values, of the plurality of prediction-specific TFIDF values, for predictions, of the plurality of predictions, other than the particular prediction;
said determining a prediction-specific distribution metric for each token of the plurality of tokens produces a plurality of prediction-specific distribution metrics that includes the particular prediction-specific distribution metric; and
determining that the particular prediction-specific distribution metric satisfies the inclusion criterion comprises determining that the particular prediction-specific distribution metric is one of a particular number of highest prediction-specific distribution metrics of the plurality of prediction-specific distribution metrics.

9. The computer-executed method of claim 1, wherein identifying the set of candidate important tokens from the plurality of tokens comprises:
using feature selection to identify one or more tokens, of the plurality of tokens, that satisfy an inclusion criterion; and
responsive to determining that the one or more tokens satisfy the inclusion criterion, including the one or more tokens in the set of candidate important tokens.

10. The computer-executed method of claim 9, wherein using feature selection to identify the one or more tokens, of the plurality of tokens, that satisfy the inclusion criterion comprises, for each prediction of the plurality of predictions:
for each token of the plurality of tokens, computing an association metric that indicates an association between said each token and said each prediction with respect to all other predictions of the plurality of predictions; and
determining that particular one or more tokens satisfy the inclusion criterion by determining that the particular one or more tokens have computed association metrics that are among a top number of computed association metrics for said each prediction.

11. The computer-executed method of claim 1, wherein determining a particular selectivity metric that indicates how selective a particular candidate important token, of the set of candidate important tokens, is for a particular prediction of the plurality of predictions comprises:
generating a set of perturbed documents by performing one or more perturbation operations, using the particular candidate important token, to perturb one or more documents of the plurality of textual documents,
wherein each perturbed document, of the set of perturbed documents, is associated with a base document of the plurality of textual documents,
for each perturbed document, of the set of perturbed documents, generating a prediction using the black box machine learning model to produce a first set of predictions corresponding to the set of perturbed documents, and
determining the particular selectivity metric for the particular candidate important token based, at least in part, on differences between the first set of predictions corresponding to the set of perturbed documents, and a second set of predictions associated with base documents for the set of perturbed documents.

12. The method of claim 1 wherein the black box machine learning model comprises at least one selected from a group consisting of an artificial neural network (ANN) model, a recurrent neural network (RNN) model, and a bidirectional encoder representations from transformers (BERT) model.

13. A computer-executed method for producing a global explanation for a black box machine learning model that is used to generate predictions for textual documents, comprising:
identifying a set of candidate important tokens from a plurality of tokens present in a plurality of textual documents;
wherein the set of candidate important tokens is less all of the plurality of tokens;
wherein each textual document, of the plurality of textual documents, is associated with a prediction of a plurality of predictions of the black box machine learning model;
for each candidate important token, of the set of candidate important tokens:
  generating a set of perturbed documents by performing one or more perturbation operations, using said each candidate important token, to perturb one or more documents of the plurality of textual documents,
  wherein each perturbed document, of the set of perturbed documents, is associated with a base document of the plurality of textual documents,
  for each perturbed document, of the set of perturbed documents, generating a prediction using the black box machine learning model to produce a first set of predictions corresponding to the set of perturbed documents,
  determining a token importance metric for said each candidate important token based, at least in part, on differences between the first set of predictions corresponding to the set of perturbed documents, and a second set of predictions associated with base documents for the set of perturbed documents, and
  responsive to the token importance metric for said each candidate important token satisfying inclusion criteria, including said each candidate important token in a set of important explainer tokens; and
generating said global explanation for the black box machine learning model based on the set of important explainer tokens;
wherein the method is performed by one or more computing devices.

14. One or more non-transitory computer-readable media storing one or more sequences of instructions for producing a global explanation for a black box machine learning model that is used to generate predictions for textual documents, wherein the one or more sequences of instructions comprise instructions that, when executed by one or more processors, cause:

tokenizing text data in a plurality of textual documents to produce a plurality of tokens;

identifying a set of candidate important tokens from the plurality of tokens;

wherein the set of candidate important tokens is less all of the plurality of tokens;

for each candidate important token, of the set of candidate important tokens:

determining a selectivity metric that indicates how selective said each candidate important token is for one or more predictions of a plurality of predictions of the black box machine learning model, and responsive to the selectivity metric for said each candidate important token satisfying inclusion criteria, including said each candidate important token in a set of important explainer tokens; and generating said global explanation for the black box machine learning model based on the set of important explainer tokens.

15. The one or more non-transitory computer-readable media of claim 14, wherein:

each textual document, of the plurality of textual documents, is associated with an associated prediction of the plurality of predictions; and the prediction associated with each textual document, of the plurality of textual documents, is one of:

generated for said each textual document using the black box machine learning model, or based on metadata associated with said each textual document.

16. The one or more non-transitory computer-readable media of claim 15, wherein the one or more sequences of instructions further comprise instructions that, when executed by one or more processors, cause:

generating a perturbed document based on a particular document of the plurality of textual documents by performing a perturbation operation over a particular candidate important token of the set of candidate important tokens;

wherein the perturbation operation is one of: token replacement by a neutral token or context elimination;

wherein determining a particular selectivity metric that indicates how selective the particular candidate important token is for a particular prediction, associated with the particular document, comprises:

using the black box machine learning model to generate a perturbation prediction for the perturbed document, and determining the particular selectivity metric based, at least in part, on whether the perturbation prediction is within a threshold amount of the particular prediction associated with the particular document.

17. The one or more non-transitory computer-readable media of claim 16, wherein:

said generating the perturbed document based on the particular document is implemented by performing token omission for the particular candidate important token, of the set of candidate important tokens, within the particular document;

wherein performing token omission comprises removing, from the particular document, one or more instances of the particular candidate important token to generate the perturbed document.

18. The one or more non-transitory computer-readable media of claim 16, wherein:

said generating the perturbed document based on the particular document is implemented by performing context elimination for the particular candidate important token, of the set of candidate important tokens, within the particular document;

wherein performing context elimination comprises replacing, within the particular document, all tokens, other than one or more instances of the particular candidate important token, with neutral tokens to generate the perturbed document.

19. The one or more non-transitory computer-readable media of claim 16, wherein:

said generating the perturbed document based on the particular document is implemented by performing token insertion for the particular candidate important token, of the set of candidate important tokens, within the particular document;

wherein performing token insertion comprises inserting, into the particular document, one or more instances of the particular candidate important token to generate the perturbed document.

20. The one or more non-transitory computer-readable media of claim 14, wherein said identifying the set of candidate important tokens from the plurality of tokens comprises, for each prediction of the plurality of predictions:

identifying a set of tokens, of the plurality of tokens, that occur within a prediction-specific set of documents, of the plurality of textual documents, associated with said each prediction;

for each token of the set of tokens:

determining a prediction-specific distribution metric for said each token based on (a) a number of times that said each token occurs within the prediction-specific set of documents associated with said each prediction, and (b) a number of times that said each token occurs within the plurality of textual documents other than the prediction-specific set of documents, and responsive to determining that the prediction-specific distribution metric for said each token satisfies an inclusion criterion, including said each token in the set of candidate important tokens.

21. The one or more non-transitory computer-readable media of claim 20, wherein:

determining a particular prediction-specific distribution metric for a particular token of the plurality of tokens and a particular prediction of the plurality of predictions, comprises:

determining a plurality of prediction-specific term frequency-inverse document frequency (TFIDF) values for the particular token by, for each prediction of the plurality of predictions, identifying a prediction-specific TFIDF value for said each prediction based on a frequency that the particular token occurs within a prediction-specific set of documents, of the plurality of textual documents, associated with said each prediction, wherein the plurality of prediction-specific TFIDF values includes a particular prediction-specific TFIDF value for the particular prediction, and calculating the particular prediction-specific distribution metric, for the particular token, based on a difference between (a) the particular prediction-specific TFIDF value for the particular prediction, and (b) an average of the prediction-specific TFIDF values, of the plurality of prediction-specific TFIDF values, for predictions, of the plurality of predictions, other than the particular prediction;

said determining a prediction-specific distribution metric for each token of the plurality of tokens produces a plurality of prediction-specific distribution metrics that includes the particular prediction-specific distribution metric; and determining that the particular prediction-specific distribution metric satisfies the inclusion criterion comprises determining that the particular prediction-specific distribution metric is one of a particular number of highest prediction-specific distribution metrics of the plurality of prediction-specific distribution metrics.

22. The one or more non-transitory computer-readable media of claim 14, wherein identifying the set of candidate important tokens from the plurality of tokens comprises:

using feature selection to identify one or more tokens, of the plurality of tokens, that satisfy an inclusion criterion; and responsive to determining that the one or more tokens satisfy the inclusion criterion, including the one or more tokens in the set of candidate important tokens.

23. The one or more non-transitory computer-readable media of claim 22, wherein using feature selection to identify the one or more tokens, of the plurality of tokens, that satisfy the inclusion criterion comprises, for each prediction of the plurality of predictions:

for each token of the plurality of tokens, computing an association metric that indicates an association between said each token and said each prediction with respect to all other predictions of the plurality of predictions; and determining that particular one or more tokens satisfy the inclusion criterion by determining that the particular one or more tokens have computed association metrics that are among a top number of computed association metrics for said each prediction.

24. The one or more non-transitory computer-readable media of claim 14, wherein determining a particular selectivity metric that indicates how selective a particular candidate important token, of the set of candidate important tokens, is for a particular prediction of the plurality of predictions comprises:

generating a set of perturbed documents by performing one or more perturbation operations, using the particular candidate important token, to perturb one or more documents of the plurality of textual documents, wherein each perturbed document, of the set of perturbed documents, is associated with a base document of the plurality of textual documents, for each perturbed document, of the set of perturbed documents, generating a prediction using the black box machine learning model to produce a first set of predictions corresponding to the set of perturbed documents, and determining the particular selectivity metric for the particular candidate important token based, at least in part, on differences between the first set of predictions corresponding to the set of perturbed documents, and a second set of predictions associated with base documents for the set of perturbed documents.

25. One or more non-transitory computer-readable media storing one or more sequences of instructions for producing a global explanation for a black box machine learning model that is used to generate predictions for textual documents, wherein the one or more sequences of instructions comprise instructions that, when executed by one or more processors, cause:

identifying a set of candidate important tokens from a plurality of tokens present in a plurality of textual documents;

wherein the set of candidate important tokens is less all of the plurality of tokens;

wherein each textual document, of the plurality of textual documents, is associated with a prediction of a plurality of predictions of the black box machine learning model;

for each candidate important token, of the set of candidate important tokens:

generating a set of perturbed documents by performing one or more perturbation operations, using said each candidate important token, to perturb one or more documents of the plurality of textual documents, wherein each perturbed document, of the set of perturbed documents, is associated with a base document of the plurality of textual documents, for each perturbed document, of the set of perturbed documents, generating a prediction using the black box machine learning model to produce a first set of predictions corresponding to the set of perturbed documents, determining a token importance metric for said each candidate important token based, at least in part, on differences between the first set of predictions corresponding to the set of perturbed documents, and a second set of predictions associated with base documents for the set of perturbed documents, and responsive to the token importance metric for said each candidate important token satisfying inclusion criteria, including said each candidate important token in a set of important explainer tokens; and generating said global explanation for the black box machine learning model based on the set of important explainer tokens.

* * * * *

UNITED STATES PATENT AND TRADEMARK OFFICE
CERTIFICATE OF CORRECTION

PATENT NO. : 11,720,751 B2  
APPLICATION NO. : 17/146375  
DATED : August 8, 2023  
INVENTOR(S) : Zohrevand et al.

Page 1 of 2

It is certified that error appears in the above-identified patent and that said Letters Patent is hereby corrected as shown below:

In the Specification

In Column 3, Line 7, delete "dataNatural" and insert -- data Natural --, therefor.

In Column 3, Line 56, delete "n iteration" and insert -- n_iteration --, therefor.

In Column 3, Lines 57-58, delete "n iteration" and insert -- n_iteration --, therefor.

In Column 12, Line 31, delete "$T^1=\{T'_1,T'_2\},I=\{I'_1,I'_2\}.$" and insert -- $T^1 = \{T'_1, T'_2\}, I' = \{I'_1, I'_2\}.$ --, therefor.

In Column 13, Line 14, delete "(t$_i$ E T):" and insert -- $(t_i \in T)$: --, therefor.

In Column 13, Line 17, delete "$\text{tfidf}_{t_i,c_j} = \text{freq}_{t_i,c_j \times inv\_freq^{t_i,D'}}$" and insert -- $\text{tfidf}_{t_i,c_j} = freq_{t_i,c_j} \times inv\_freq_{t_i,D'}$ --, therefor.

In Column 13, Line 21, delete "$inv\_freq_{t_i,D'}$" and insert -- $inv\_freq_{t_i,D'}$ --, therefor.

In Column 13, Line 35, delete "$\text{tfidf}_{t_i,c_j} - (\Sigma_{m \neq j} \text{tfidf}_{t_i,c_m}/(M-^1))$" and insert -- $\text{tfidf}_{t_i,c_j} - (\Sigma_{m \neq j} \text{tfidf}_{t_i,c_m}/(M-1))$ --, therefor.

In Column 17, Line 28, delete "(D' P)" and insert -- $(D'_i \rightarrow P_{1,i})$ --, therefor.

In Column 19, Line 1, delete "(d$_r$)" and insert -- $(d_p)$ --, therefor.

Signed and Sealed this  
Fourth Day of June, 2024

Katherine Kelly Vidal  
*Director of the United States Patent and Trademark Office*

In Column 19, Line 3, delete "$t_i;$" and insert -- $t_i:$ --, therefor.

In Column 19, Line 47, before "from" insert -- $t_i$, --, therefor.

In Column 27, Line 9, delete "and or" and insert -- and/or --, therefor.

In the Claims

In Column 41, Line 1, in Claim 21, delete "specificTFIDF" and insert -- specific TFIDF --, therefor.